US009161181B2

(12) United States Patent
Tada et al.

(10) Patent No.: US 9,161,181 B2
(45) Date of Patent: Oct. 13, 2015

(54) COMMUNICATION METHOD, BASE STATION, COMMUNICATION SYSTEM, AND MOBILE TERMINAL

(75) Inventors: Keiko Tada, Tokyo (JP); Mitsuru Mochizuki, Tokyo (JP); Miho Maeda, Tokyo (JP); Yasushi Iwane, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 768 days.

(21) Appl. No.: 12/522,973

(22) PCT Filed: Feb. 1, 2008

(86) PCT No.: PCT/JP2008/000130
§ 371 (c)(1),
(2), (4) Date: Jul. 13, 2009

(87) PCT Pub. No.: WO2008/096527
PCT Pub. Date: Aug. 14, 2008

(65) Prior Publication Data
US 2010/0046451 A1    Feb. 25, 2010

(30) Foreign Application Priority Data
Feb. 2, 2007    (JP) .................................. 2007-024141

(51) Int. Cl.
H04W 4/10         (2009.01)
H04W 76/00        (2009.01)
H04W 72/00        (2009.01)
(Continued)

(52) U.S. Cl.
CPC .............. *H04W 4/10* (2013.01); *H04W 76/005* (2013.01); *H04W 72/005* (2013.01); *H04W 72/04* (2013.01); *H04W 72/12* (2013.01); *H04W 76/04* (2013.01); *H04W 76/048* (2013.01); *H04W 88/02* (2013.01)

(58) Field of Classification Search
CPC ........................... H04W 76/04; H04W 76/048
USPC ............................................ 370/329; 375/260
See application file for complete search history.

(56) References Cited

U.S. PATENT DOCUMENTS 7,756,087 B2 *   7/2010   Kim et al. ...................... 370/335
8,111,662 B2 *   2/2012   Lee et al. ...................... 370/330
(Continued)

FOREIGN PATENT DOCUMENTS

EP        1 469 373 A1      10/2004
JP        2008-510422         4/2008
(Continued)

OTHER PUBLICATIONS

Tallinn, Estonia, VoIP support in LTE, Aug. 28-Sep. 1, 2006, 3GPP TSG-RAN 2 Meeting # 54 Tdoc R2-062218, pp. 1-3.*
(Continued)

*Primary Examiner* — Shripal Khajuria
*Assistant Examiner* — Faisal Choudhury
(74) *Attorney, Agent, or Firm* — Oblon, McClelland, Maier & Neustadt, L.L.P.

(57) ABSTRACT

In accordance with the present invention, in a case of using persistent scheduling, when detecting a transition from a talk state to a silent state, resources to be allocated during a silent state are allocated to a channel exclusive for silent period, and the resources which have been allocated to a mobile terminal during the talk spurt are released. Therefore, the useless allocation of resources can be reduced, and the throughput of the system can be improved.

16 Claims, 19 Drawing Sheets

(51) Int. Cl.
  *H04W 72/04* (2009.01)
  *H04W 72/12* (2009.01)
  *H04W 76/04* (2009.01)
  *H04W 88/02* (2009.01)

(56) References Cited

U.S. PATENT DOCUMENTS

| | | | |
|---|---|---|---|
| 8,396,070 B2* | 3/2013 | Sung et al. | 370/437 |
| 2003/0043854 A1* | 3/2003 | Uchide | 370/498 |
| 2005/0181797 A1 | 8/2005 | Piirainen | |
| 2006/0245352 A1* | 11/2006 | Kang et al. | 370/229 |
| 2006/0245470 A1 | 11/2006 | Balachandran et al. | |
| 2008/0037413 A1* | 2/2008 | Gu et al. | 370/210 |
| 2008/0090583 A1* | 4/2008 | Wang et al. | 455/452.1 |
| 2008/0101286 A1* | 5/2008 | Wang et al. | 370/329 |
| 2008/0107056 A1* | 5/2008 | Choi et al. | 370/311 |
| 2008/0117891 A1* | 5/2008 | Damnjanovic et al. | 370/345 |
| 2008/0198800 A1* | 8/2008 | Zhang et al. | 370/329 |
| 2009/0232084 A1* | 9/2009 | Li et al. | 370/330 |
| 2010/0046461 A1* | 2/2010 | Wennstrom | 370/329 |
| 2010/0177716 A1* | 7/2010 | Harada et al. | 370/329 |

FOREIGN PATENT DOCUMENTS

| | | |
|---|---|---|
| KR | 10-2002-0043244 | 6/2002 |
| KR | 10-2006-0003013 | 1/2006 |
| KR | 10-2006-0113345 | 11/2006 |
| WO | WO 03/013162 A2 | 2/2003 |
| WO | WO 2006/019267 A1 | 2/2006 |
| WO | 2006 134950 | 12/2006 |
| WO | 2008 023649 | 2/2008 |

OTHER PUBLICATIONS

Riga, Latvia, Discussion on control signalling for persistent scheduling of VoIP, Nov. 6-10, 2006, 3GPP TSG-RAN WG1 Meeting # 47 R1-063275 pp. 1-3.*

Riga et al , Discussion on control signalling for persistent scheduling of VoIP, Nov. 6-10, 2006, 3GPP TSG-RAN WG1 Meeting # 47 R1-063275.*

Watanabe, K. et al., "Tekio Access Seigyo Hoshiki o Mochiita Tekio Hencho Yoyakugata TDMA System", The Transactions of the Institute of Electronics, Information and Communication Engineers B, vol. J83-B, No. 12, pp. 1682-1691, (2000).

"Persistant Scheduling", 3GPP contributions R2-061920, 3GPP TSG RAN WG2 Ad Hoc on LTE $27^{th}$-$30^{th}$, (2006).

"VoIP support in LTE", 3GPP contributions R1-070333 3GPP TSG RAN WG1 Meeting #47 bis $15^{th}$-$19^{th}$ (2007).

"Comparison of persistent resource allocation schemes in LTE uplink", 3GPP contributions R2-070283 3GPP TSG RAN WG2 #56 $15^{th}$-$19^{th}$ (2007).

"Multiplexing including reference-signal structure" 7.1.1.2 "Basic transmission scheme" 9.1.1 3GPP TR25.814V7.0.0 Release7 (2006).

"Persistant Scheduling in E-UTRA", 3GPP contributions R1-070098 3GPP TSG RAN WG1 Meeting #47 bis $15^{th}$-$19^{th}$. (2007).

Chinese Office Action issued on Aug. 31, 2011 in corresponding Chinese Application No. 200880000038.1 (with an English Translation).

"R2-062218, VoIP Support in LTE", Samsung, 3GPP TSG-RAN2 Meeting # 54, Aug. 28-Sep. 1, 2006, pp. 1-4.

Japanese Office Action issued May 22, 2012, in Patent Application No. 2010-243359 (with Partial English-language translation).

"Problems of Persistent Scheduling", Ericsson, 3GPP TSG-RAN WG2 #56-bis, Tdoc R2-070041, Jan. 15-19, 2007, pp. 1-7.

Extended European Search Report issued Aug. 20, 2012 in Patent Application No. 08702862.7.

"Periodic Scheduling of Uplink Resources for LTE VoIP", InterDigital Communications Corporation, 3GPP TSG RAN WG2 #56, R2-063183, vol. RAN WG2, No. Riga, Latvia, XP 050132684A, Nov. 6-10, 2006, 6 pages.

"Semi Persistent Scheduling" Ericsson, TSG-RAN WG2 Meeting #55, R2-062859, vol. Ran WG2, No. Seoul, Korea, XP 050132382A, Oct. 9-13, 2006, 5 pages.

"Scheduling of LTE UL VoIP", Nokia, 3GPP TSG-RAN WG2 Meeting #56bis, R2-070020, vol. RAN WG2, No. Sorrento, Italy, XP 050133137A, Janauary 15-19, 2007, 4 pages.

"Discussion on Control Signalling for Persistent Scheduling of VoIP", Samsung, 3GPP TSG-RAN2 Meeting #56, R2-063482, vol. Ran WG2, No. Riga, Latvia, XP 050132940, Nov. 6-10, 2006, 4 pages.

Australian Patent Examination Report issued Feb. 26, 2013 in Australian Patent Application No. 2011201566.

Japanese Office Action issued Nov. 5, 2013 in JP Patent Application No. 2012-227008 with English Translation.

"UL LFDMA with hopping" by Samsung, 3GPP RAN WG1 #47bis meeting R1-070337, Jan. 15, 2007 (6 pgs.).

"Evaluation of Frequency Hopping Schemes in E-UTRAN Uplink" by Huawei, 3GPP TSG RAN WG1 meeting #47 R1-063082, Nov. 6, 2006 (13 pgs.).

"Performance comparison between LFDMA and DFDMA transmission in UL" by Samsung, 3GPP RAN WG1 #46bis meeting R1-062513, Oct. 9, 2006 (6 pgs.).

Korean Office Action issued Aug. 8, 2014, in Korea Patent Application No. 10-2014-7013206 (with partial English translation).

Office Action issued Jun. 17, 2015 in Korean Patent Application No. 10-2014-7013206 (with partial English translation).

* cited by examiner

FIG. 5
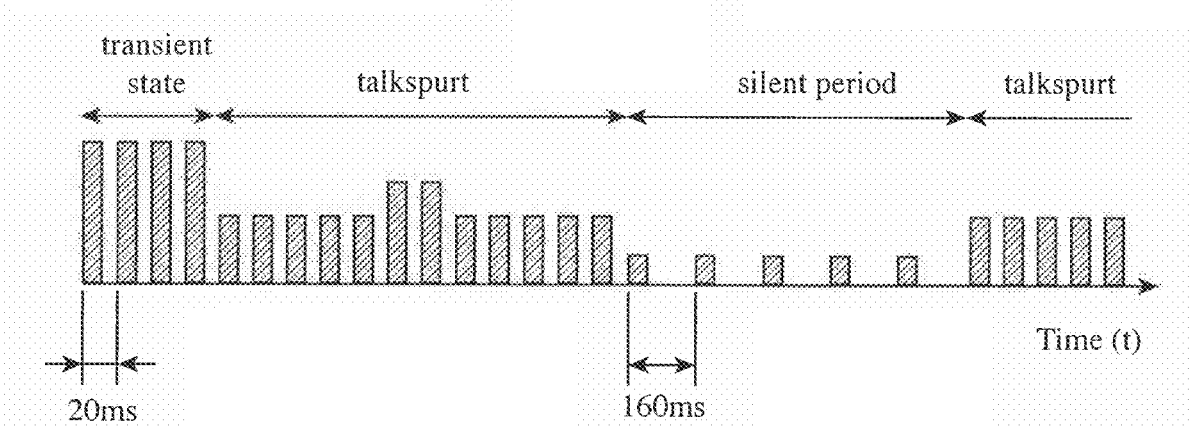
FIG. 6
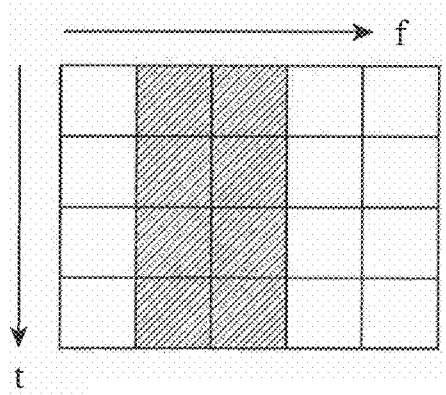
(a) localized
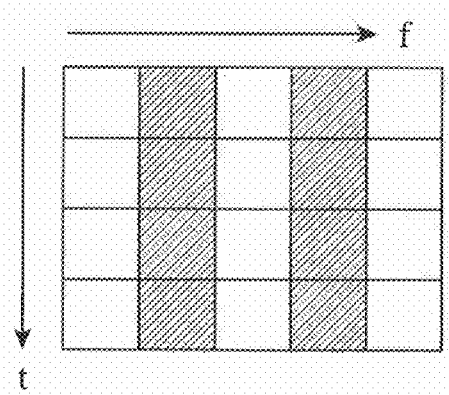
(b) distributed

FIG. 9
(1) Frequency Division Multiplexing
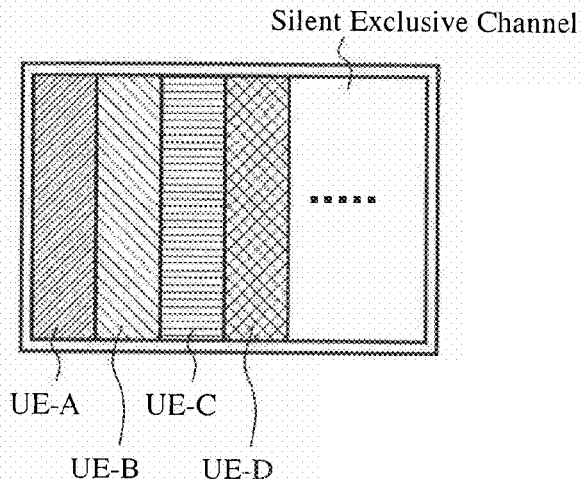
(2) Time Division Multiplexing
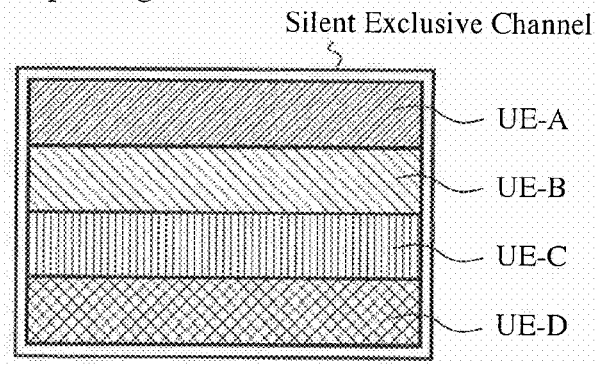
(3) Code Division Multiplexing
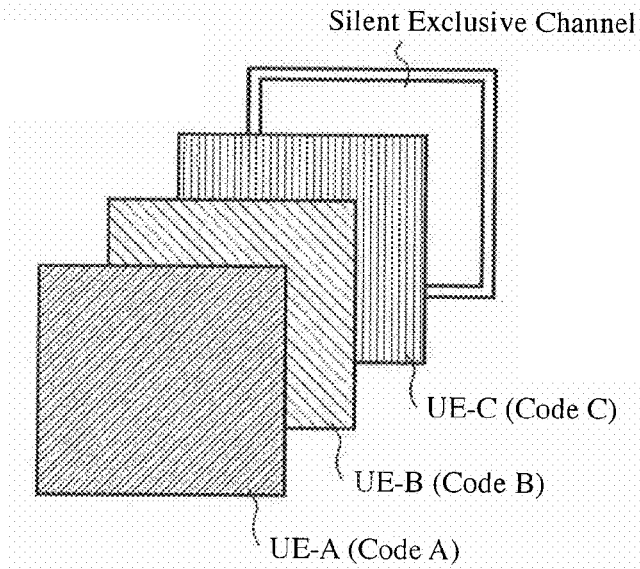

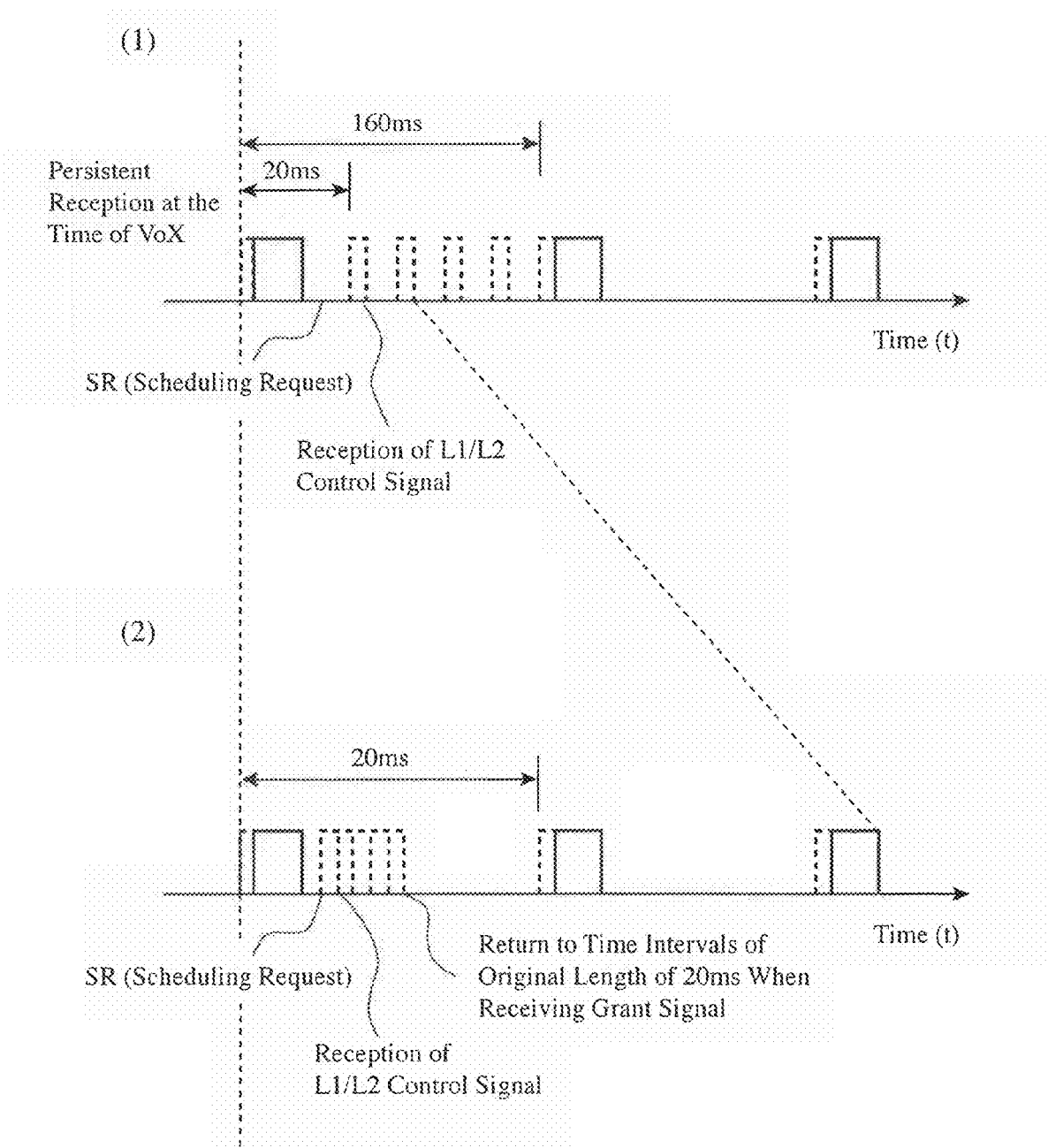

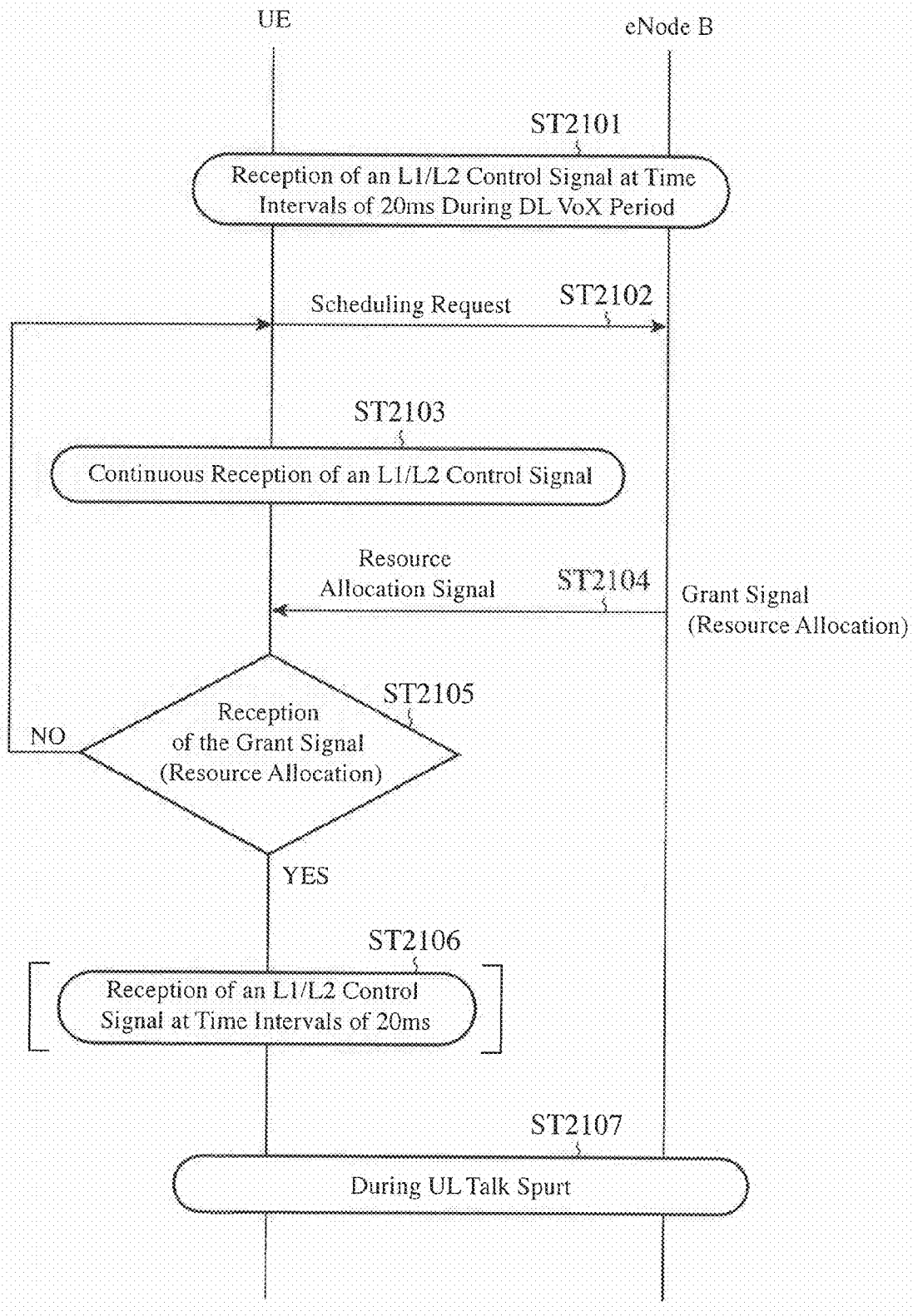

COMMUNICATION METHOD, BASE STATION, COMMUNICATION SYSTEM, AND MOBILE TERMINAL

FIELD OF THE INVENTION

The present invention relates to a communication system which is called "long term evolution" ("Long Term Evolution" LTE), a base station and a mobile terminal which construct this communication system, a method of controlling communications between the base station and the mobile terminal at the time of communications, and a communication method of communicating a control signal.

BACKGROUND OF THE INVENTION

Commercial services which employ a W-CDMA (Wideband Code Division Multiple Access) method which is included in communication methods called a third generation were started in Japan since 2001. Furthermore, a service with HSDPA (High Speed Down Link Packet Access) which implements a further improvement in the speed of data transmission using downlinks (a dedicated data channel and a dedicated control channel) by adding a channel for packet transmission (HS-DSCH: High Speed-Downlink Shared Channel) to the downlinks has been started. Currently, anHSUPA (High Speed Up Link Packet Access) method has also been suggested and studied in order to speed up uplink data transmission. The W-CDMA is a communication method which was determined by the 3GPP (3rd Generation Partnership Project) which is the organization of standardization of mobile communication systems, and the technical specification of the release 6 has been being organized currently.

In the 3GPP, as a communication method different from the W-CDMA, a new communication method having a wireless section, which is referred to as "Long Term Evolution" (LTE), and a whole system structure including a core network, which is referred to as "System Architecture Evolution" (SAE), has been studied. The LTE has an access method, a radio channel configuration, and protocols which are different from those of the current W-CDMA (HSDPA/HSUPA). For example, while the W-CDMA uses, as its access method, code division multiple access (Code Division Multiple Access), the LTE uses, as its access method, OFDM (Orthogonal Frequency Division Multiplexing) for the downlink direction and uses SC-FDMA (Single Career Frequency Division Multiple Access) for the uplink direction. Furthermore, while the W-CDMA has a bandwidth of 5 MHz, the LTE can have a bandwidth of 1.25/2.5/5/10/15/20 MHz. In addition, the LTE uses only a packet communication method, instead of a circuit switching method which the W-CDMA uses.

According to the LTE, because a communication system is constructed by using a new core network different from a core network (which is called General Packet Radio System GPRS) which complies with the W-CDMA, the communication system is defined as an independent radio access network which is separate from a W-CDMA network. Therefore, in order to distinguish from a communication system which complies with the W-CDMA, in a communication system which complies with the LTE, a base station (Base station) which communicates with a mobile terminal UE (User Equipment) is called eNB (which may be referred to as E-UTRAN NodeB or eNodeB in some cases), a base station control apparatus (Radio Network Controller) which performs exchange of control data and user data with a plurality of base stations is called an aGW (Access Gateway). This communication system which complies with the LTE carries out point-to-multipoint (Point to Multipoint) communications, such as a multicast and broadcast type multimedia service called an E-MBMS (Evolved Multimedia Broadcast Multicast Service), and also provides a communication service such as a unicast (Unicast) service for each mobile terminal among a plurality of mobile terminals. In the case of the LTE, because no dedicated channels (Dedicated Channel and Dedicated Physical Channel) destined for each mobile terminal exist in transport channels and physical channels, transmission of data to each mobile terminal is carried out by using a shared channel (Shared channel), unlike in the case of the W-CDMA.

When data transmission occurs in an uplink or a downlink, scheduling which enables communications between the base station and the mobile terminal is carried out for the uplink or the downlink. For example, in the downlink scheduling, the base station allocates radio resources according to both the size of data which have occurred and the communication path quality to the mobile terminal, and sets up a modulation method and an error correcting code method (MCS: Modulation and Coding scheme) according to target quality and a target data speed. In the uplink scheduling, when transmission data destined for the base station occur in the mobile terminal, the mobile terminal transmits a signal (an uplink scheduling request SR: Scheduling Request) with which to make a request for allocation of uplink radio resources, and the base station allocates uplink radio resources to the mobile terminal in response to the signal. Control signals used for such scheduling control which enables communications between the mobile terminal and the base station via a radio link include an upper layer signal, such as an "L3 control signal" (Layer3 control signaling or L3 message), and a signal which is called an "L1/L2 control signal" (Layer1/Layer2 control signaling). An L3 control signal is typically notified from an upper layer like an RRC layer at the time of initial transmission including the time of occurrence of a call connection (RRC Connect), and is used, via a downlink, for an uplink channel setup, a downlink channel setup, or allocation of radio resources. In contrast, an L1/L2 control signal is frequently exchanged between the mobile terminal and the base station in both an uplink and a downlink. As an uplink scheduling request signal with which the mobile terminal makes a request of the base station for allocation of radio resources via an uplink, the mobile terminal uses an L1/L2 control signal. Also at the time of changing the radio resources irregularly according to a change in the data size or a requirement of desired quality of the communication path, including the time of occurrence of a call connection and the time of continuation of a call connection, the mobile terminal uses an L1/L2 control signal. L1/L2 control signals include an Ack/Nack with which the base station or the mobile terminal answers whether it has received data correctly when receiving the data by way of an uplink or a downlink, and quality information CQI (Channel Quality Indicator) indicating the quality of received data or the quality of the communication path.

A core network according to the LTE is a network with packet connection, and user data, including real time data, such as voice data, are altogether packetized. In a case of general transmission of packet data, no real-time nature is required of the data, and the speed of the data which are transmitted and received can vary irregularly according to the description of the data. In contrast, because real time data, such as voice data, have to be reproduced in real time by a communications partner even if they are packetized, data having a predetermined size can occur at fixed time intervals. Therefore, in allocation of radio resources which results from scheduling, different scheduling methods are needed when carrying out general communications of packet data and when carrying out communications of real time data such as voice data. For data, such as general packet data, whose speed is varied according to the description of the data and which have to comply with high speed communications, a dynamic scheduling (dynamic scheduling) method of being able to change the settings of the radio resources dynamically according to the communication path quality and the data speed (the data size) every TTI (=1 ms) is used. On the other hand, for communications, such as communications of voice data, in which a real-time nature is required and data having a predetermined size occur at fixed time intervals, a persistent scheduling (Persistent scheduling) method of being able to allocate radio resources at fixed time intervals and continuously is used because the communications are carried out at a low speed and the data have either of one or more determined sizes. A modulation method and error correction conditions (MCS) can be allocated at fixed time intervals and continuously according to both the size of data which can occur and predetermined target quality. Nonpatent reference 1 discloses, as a merit of the persistent scheduling, large reduction in the volume of traffic of L1/L2 control signals transmitted between a mobile terminal and abase station because the base station does not have to carry out a setup and update of radio resources by using an L1/L2 control signal and does not have to report a received data quality report (CQI) every TTI (=1 ms) after notifying allocation of radio resources and settings of MCS to the mobile terminal by way of an L3 control signal at the time of initial transmission.

However, because the data rate of voice data which are actually communicated in a network varies at an arbitrary timing due to the user's talk quality or operation during talk, the base station actually has to perform a setup and an update of radio resources in the course of voice communications by using an L3 control signal or an L1/L2 control signal. In voice communications which comply with the LTE, it is expected that a method called AMR (Adaptive Multi Rate), which is used, as a standard voice codec, by the W-CDMA of the 3GPP, will be adopted. The AMR method which is assumed, as a standard method, by the 3GPP includes a method which is called narrowband (Narrow band), and a method which is called wideband (Wide band). The narrowband AMR is a coding method which is based on that a voice is sampled at a frequency of 8 kHz. In contrast, the wideband AMR is a coding method which is based on that a voice is sampled at a frequency of 16 kHz, and supports higher-speed multimedia data and is aimed at implementation of high-rate and high-quality voice communications. In nonpatent reference 2, FIG. 5 is a figure showing an operation at a time of communicating packetized voice data (VoIP data) via an uplink after the voice data are compressed by using the narrowband AMR. As shown in the nonpatent reference 2, the state of voice communications which use AMR for compression encoding is divided into the following three states: a transient state (transient state), a talk state (a talk spurt, a talk time, or a talk period), and a silent state (a silent period or a VOX period). In the transient state and in the talk spurt, data are updated every 20 milliseconds. In the silent state, if a section in which voice data do not occur is long, background noise data (SID) are updated every 160 milliseconds. A transition to this state occurs at an arbitrary timing. Because there is a high possibility that the communication quality state changes due to a transition to the silent state, it is necessary to change the radio resources and the settings of MCS by way of a control signal in the course of the transition to the silent state. Because, in a case of carrying out persistent scheduling at a time of communications of real time data such as voice data, a control operation of updating the data at fixed time intervals and changing the data rate and the time intervals at which data occur in the course of the communications is performed, the issue of omitting the useless control of communications between the base station and the mobile terminal while maintaining the communication quality in the course of the communications, and simplifying the resource management in the scheduling, thereby reducing the operating load on both the base station and the mobile terminal, and the issue of how to respond to the real-time nature of data must be addressed.

In nonpatent reference 3, as to a persistent scheduling method for use in voice packet data communications via an uplink, a plurality of suggestions by several companies are compared. The nonpatent reference 3 discloses that all the companies suggest that in a state transition between a silent state and a talk state which temporarily occurs at a time of voice communications with AMR, a re-setup and a change of radio resources have to be carried out between a mobile terminal and a base station by using an L1/L2 control signal or an L3 control signal. However, the nonpatent reference 3 only lists problems that a communication delay and a waste of the resources can occur when an overhead of a control signal or an receiving error of a control signal occurs for each suggestion, but does not disclose any concrete solution of "the problems to be solved by the invention" as shown in the specification of the present invention, and any suggestion as to "the advantages of the invention" as shown in the specification of the present invention.

As the method of allocating radio resources which are used at a time of data communications according to the LTE, there are a radio resource allocation method which is called "localized" (localized) and a radio resource allocation method which is called "distributed" (distributed) (nonpatent reference 4). FIGS. 6(a) and 6(b) are figures showing a method of dividing a time-frequency region which a base station can use into a plurality of blocks on the frequency axis and on the time axis, and allocating them to mobile terminals. Each divided block unit is called a resource unit (RU: Resource Unit) in the case of an uplink, and is called a resource block (RB: Resource Block) in the case of a downlink. FIG. 6(a) shows an example in which radio resources are allocated in a localized fashion on the time and frequency axes, and FIG. 6(b) shows an example in which radio resources are allocated in a distributed fashion on the time and frequency axes. As shown in FIG. 6(a), the localized allocation is a method of allocating radio resources having one or more continuous frequency bands on the frequency axis at the same timing. In contrast, in the distributed allocation shown in FIG. 6(b), two or more radio resources which are separated from one another (=distributed) are simultaneously used on the frequency axis. In the 3GPP, localized allocation as shown in FIG. 6(a) has been studied for an uplink and localized radio resource allocation has been studied for a downlink, and distributed radio resource allocation as shown in FIG. 6(b) has been studied.

Nonpatent reference 5 discloses a radio resource allocation method of, as to persistent scheduling, dividing the interior of one radio resource block into parts with a plurality of frequencies for a downlink and then distributing and allocating radio resources used for a mobile terminal to the plurality of divided parts of the resource block, and making a hopping of one radio resource frequency to allocate for an uplink. However, the nonpatent reference does not disclose any solution of "the problems to be solved by the invention" as shown in the specification of the present invention.

[Nonpatent reference 1] 3GPP contributions R2-061920
[Nonpatent reference 2] 3GPP contributions R1-070333
[Nonpatent reference 3] 3GPP contributions R2-070283

[Nonpatent reference 4] 3GPP TR25.814V7.0.0
[Nonpatent reference 5] 3GPP contributions R1-070098

In scheduling for use in conventional user data communications, dynamic scheduling of, by, generally, using an L3 control signal or an L1/L2 control signal, performing a setup of a modulation method and making settings of conditions (MCS) of an error correcting code, as needed, and also performing allocation of radio resources plays a predominant role. On the other hand, in recent years, for real time data, such as voice data, which occur at fixed time intervals and continuously, a scheduling method, which is called persistent scheduling, of performing a setup of a modulation method and making settings of conditions (MCS) of an error correcting code, and also performing allocation of radio resources in advance according to the regularity of data occurrence at the time of initial transmission has been suggested. However, because the data rate and the data generation time intervals of real time data, such as actual voice data, change in the course of communications according to the quality of the voice talk and the user's operation (a silent state), control according to these changes is needed in the course of communications. A challenge is therefore to change the allocation of radio resources and the MCS according to the data rate and the quality of data which vary at an arbitrary timing in order to make effective use of the radio resources and maintain the communication path quality, and to also reduce useless resource allocation which is caused in that case, reduce the amount and frequency of control signals which are generated in the course of communications, and reduce the system load. Another challenge is to provide a radio resource allocation method which makes it easy to stabilize the communication quality in order to reduce the occurrence of control signals in the course of communications. A further challenge is to reduce the delay which is caused by an overhead or a receiving error of a control signal transmitted between the base station and the mobile terminal, thereby reducing the delay to a minimum so that the data can be reproduced in real time.

The present invention is made in order to solve the above-mentioned challenges, and it is therefore an object of the present invention to provide a data communication method, a communication system, and a mobile terminal which, when performing persistent scheduling, can not only cope with the data rate and quality which vary at an arbitrary timing, and but also perform resource management which enables effective use of the radio resources in a whole system. It is another object of the present invention to provide a data communication method, a communication system, and a mobile terminal which change allocation of radio resources and MCS in the course of communications according to a change in the data rate and a change in the data generation time intervals which can occur at an arbitrary timing, and also reduces useless resource allocation, which can reduce the amount of occurrence and the frequency of an L3 control signal or an L1/L2 control signal which occurs in the course of communications, and which perform scheduling which makes it easy to stabilize the communication quality. It is a further object of the present invention to provide a data communication method and a communication system which perform scheduling with a delay, such as an overhead of a control signal transmitted between a base station and a mobile terminal, which does not affect real-time reproduction of data, and the mobile terminal.

DISCLOSURE OF THE INVENTION

In accordance with the present invention, there is provided a data communication method which is executed by a communication system including a base station which performs a persistent scheduling process of transmitting a scheduling result in a predetermined notification cycle, and which transmits and receives packet data by using an OFDM (Orthogonal Frequency Division Multiplexing) method as a downlink access method, and a mobile terminal which transmits a scheduling request signal with which to make a request of the base station for allocation of radio resources, and which transmits and receives the packet data by using radio resources allocated thereto by the base station, in which the data communication method includes: a talk state judging process of, when there exists voice information to be transmitted to the mobile terminal, judging whether the state is either a talk state in which the base station transmits the voice information as voice packet data or a silent state in which the base station transmits background noise data as the voice packet data; a notification process of notifying both talk-spurt radio resources available to the talk spurt and silent-period radio resources available to the silent state to the mobile terminal at a time of initial transmission between the base station and the mobile terminal; and a radio resource allocating process of allocating talk-spurt radio resources to another mobile terminal when detecting a transition from the talk state to the silent state through the talk state judging process.

In accordance with the present invention, there is provided a base station which performs a persistent scheduling process of transmitting a scheduling result in a predetermined notification cycle, and which transmits and receives packet data by using an OFDM (Orthogonal Frequency Division Multiplexing) method as a downlink access method, in which the base station includes: a notification processing unit for notifying both talk-spurt radio resources available to a talk spurt in which the base station transmits the voice information as voice packet data and silent-period radio resources available to a silent state in which the base station transmits background noise data as the voice packet data to the mobile terminal at a time of initial transmission to the mobile terminal; and a control unit for judging whether the state is either the talk state or the silent state, and for performing a radio resource allocating process of allocating the talk-spurt radio resources to another mobile terminal when detecting a transition from the talk state to the silent state.

In accordance with the present invention, there is provided a communication system including a base station which performs a persistent scheduling process of transmitting a scheduling result in a predetermined notification cycle, and which transmits and receives packet data by using an OFDM (Orthogonal Frequency Division Multiplexing) method as a downlink access method, and a mobile terminal which transmits a scheduling request signal with which to make a request of the base station for allocation of radio resources, and which transmits and receives the packet data by using radio resources allocated thereto by the base station, in which the communication system includes: a base station having a notification processing unit for notifying both talk-spurt radio resources available to a talk spurt in which the base station transmits the voice information as voice packet data and silent-period radio resources available to a silent state in which the base station transmits background noise data as the voice packet data to the mobile terminal at a time of initial transmission between the base station and the mobile terminal, and a control unit for judging whether the state is either the talk state or the silent state, and for performing a radio resource allocating process of allocating the talk-spurt radio resources to another mobile terminal when detecting a transition from the talk state to the silent state; and a mobile terminal having a receiving unit for receiving the voice packet data by using the silent-period radio resources when the base station detects a transition from the talk state to the silent state.

In accordance with the present invention, there is provided a mobile terminal which transmits a scheduling request signal with which to make a request of a base station which transmits and receives packet data by using an OFDM (Orthogonal Frequency Division Multiplexing) method as a downlink access method for allocation of radio resources, and which transmits and receives the above-mentioned packet data by using radio resources allocated thereto by the base station, in which the mobile terminal transmits the scheduling request signal, and also performs continuous reception in such a way as to receive a scheduling result at an arbitrary timing independent of a notification cycle of a persistent scheduling process performed by the base station.

In accordance with the present invention, there is provided the data communication method which is executed by a communication system including a base station which performs a persistent scheduling process of transmitting a scheduling result in a predetermined notification cycle, and which transmits and receives packet data by using an OFDM (Orthogonal Frequency Division Multiplexing) method as a downlink access method, and a mobile terminal which transmits a scheduling request signal with which to make a request of the base station for allocation of radio resources, and which transmits and receives the above-mentioned packet data by using radio resources allocated thereto by the above-mentioned base station, in which the data communication method includes: a talk state judging process of, when there exists voice information to be transmitted to the mobile terminal, judging whether the state is either a talk state in which the base station transmits the voice information as voice packet data or a silent state in which the base station transmits background noise data as the voice packet data; a notification process of notifying both talk-spurt radio resources available to the talk spurt and silent-period radio resources available to the silent state to the mobile terminal at a time of initial transmission between the base station and the mobile terminal; and a radio resource allocating process of allocating the talk-spurt radio resources to another mobile terminal when detecting a transition from the talk state to the silent state through the talk state judging process. As a result, the useless allocation of resources can be reduced, and the throughput of the system can be improved.

In accordance with the present invention, there is provided the base station which performs a persistent scheduling process of transmitting a scheduling result in a predetermined notification cycle, and which transmits and receives packet data by using an OFDM (Orthogonal Frequency Division Multiplexing) method as a downlink access method, in which the base station includes: a notification processing unit for notifying both talk-spurt radio resources available to a talk spurt in which the base station transmits the voice information as voice packet data and silent-period radio resources available to silent state in which the base station transmits background noise data as the voice packet data to the mobile terminal at a time of initial transmission to the mobile terminal; and a control unit for judging whether the state is either the talk state or the silent state, and for performing a radio resource allocating process of allocating talk-spurt radio resources to another mobile terminal when detecting a transition from the talk state to the silent state. As a result, the useless allocation of resources can be reduced, and the throughput of a system with the base station can be improved.

In accordance with the present invention, there is provided a communication system including a base station which performs a persistent scheduling process of transmitting a scheduling result in a predetermined notification cycle, and which transmits and receives packet data by using an OFDM (Orthogonal Frequency Division Multiplexing) method as a downlink access method, and a mobile terminal which transmits a scheduling request signal with which to make a request of the base station for allocation of radio resources, and which transmits and receives the packet data by using radio resources allocated thereto by the base station, in which the communication system includes: a base station having a notification processing unit for notifying both talk-spurt radio resources available to a talk spurt in which the base station transmits the voice information as voice packet data and silent-period radio resources available to silent state in which the base station transmits background noise data as the voice packet data to the mobile terminal at a time of initial transmission between the base station and the mobile terminal, and a control unit for judging whether the state is either the talk state or the silent state, and for performing a radio resource allocating process of allocating the talk-spurt radio resources to another mobile terminal when detecting a transition from the talk state to the silent state; and a mobile terminal having a receiving unit for receiving the voice packet data by using the silent-period radio resources when the base station detects a transition from the talk state to the silent state. As a result, the useless allocation of resources can be reduced, and the throughput of the system can be improved.

In accordance with the present invention, there is provided the mobile terminal which transmits a scheduling request signal with which to make a request of a base station which transmits and receives packet data by using an OFDM (Orthogonal Frequency Division Multiplexing) method as a downlink access method for allocation of radio resources, and which transmits and receives the packet data by using radio resources allocated thereto by the base station, in which the mobile terminal transmits the scheduling request signal, and also performs continuous reception in such a way as to receive a scheduling result at an arbitrary timing independent of a notification cycle of a persistent scheduling process performed by the base station. As a result, a time delay can be reduced to a minimum.

BRIEF DESCRIPTION OF THE FIGURES

FIG. 5 is a figure showing an example of data communication timing at a time of communicating, via an uplink, VoIP data to which a voice compressed with an AMR voice codec method is packetized;

FIG. 6 is a figure showing a radio resource allocation method using scheduling according to the LTE;

FIG. 9 is an explanatory drawing for explaining a process of multiplexing signals from a plurality of mobile terminals in resource blocks of a channel exclusive for radio period;

FIG. 20 is an explanatory drawing showing a receiving method of receiving a downlink L1/L2 control signal by a UE; and FIG. 21 is a flow chart showing processes of a communication method in accordance with Embodiment 5 of the present invention.

PREFERRED EMBODIMENTS OF THE INVENTION

Hereafter, in order to explain this invention in greater detail, the preferred embodiments of the present invention will be described with reference to the accompanying drawings.

Embodiment 1

Figure 1:
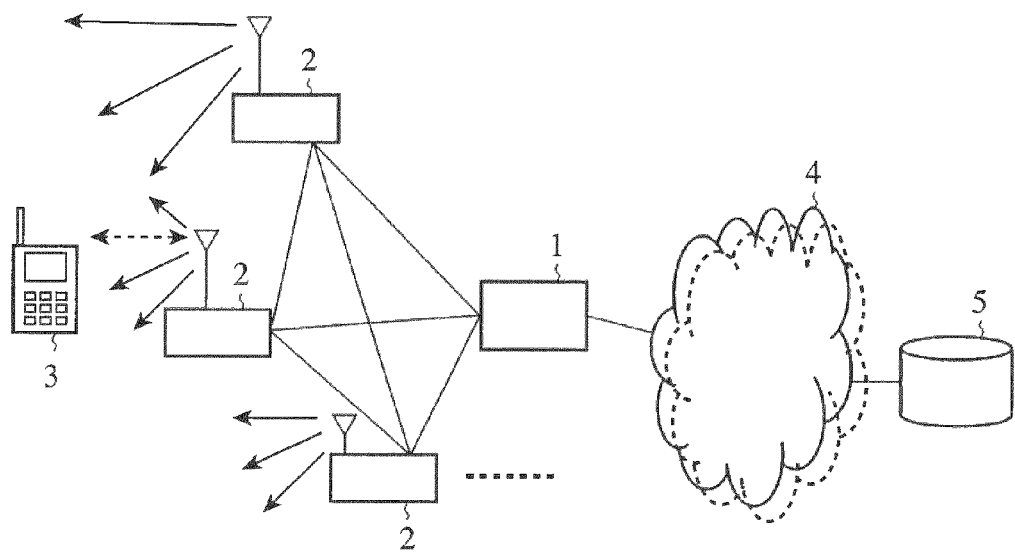
FIG. 1 is an explanatory drawing showing the structure of a mobile communication system according to the LTE.

FIG. 1 is an explanatory drawing showing the structure of a mobile communication system which complies with LTE. In FIG. 1, an aGW 1 performs transmission and reception of control data and user data with a plurality of base stations (eNB) 2, and a base station 2 transmits and receives data to and from a plurality of mobile terminals (UE) 3. Between a base station 2 and a mobile terminal 3, broadcast information, information used for processing a call, individual control data, individual user data, control data for E-MBMS, user data, and so on are transmitted. It has also been studied that base stations 2 communicate with each other. A base station 2 has uplink and downlink schedulers. These schedulers of a base station 2 enable transmission and reception of data between the base station 2 and each mobile terminal 3, and carry out scheduling for improvements in the throughput of each mobile terminal 3 and that of the whole mobile communication system.

A E-MBMS provides a broadcast type point-to-multipoint (Point to Multipoint) communication service with which data are transmitted at a time from a certain base station toward a plurality of mobile terminals. Concretely, an information service, such as news or weather forecast, and a large-volume broadcast service, such as mobile TV, have been studied. The aGW 1 communicates with a service center 5 via a PDN 4 (Packet Data Network). The service center 5 stores and distributes a content used for providing a service for users. A content provider transmits E-MBMS data, such as mobile TV broadcast data, to the service center 5. The service center 5 stores the E-MBMS data therein and also transmits the E-MBMS data to base stations 2 via the PDN 4 and the aGW 1.

Figure 2:
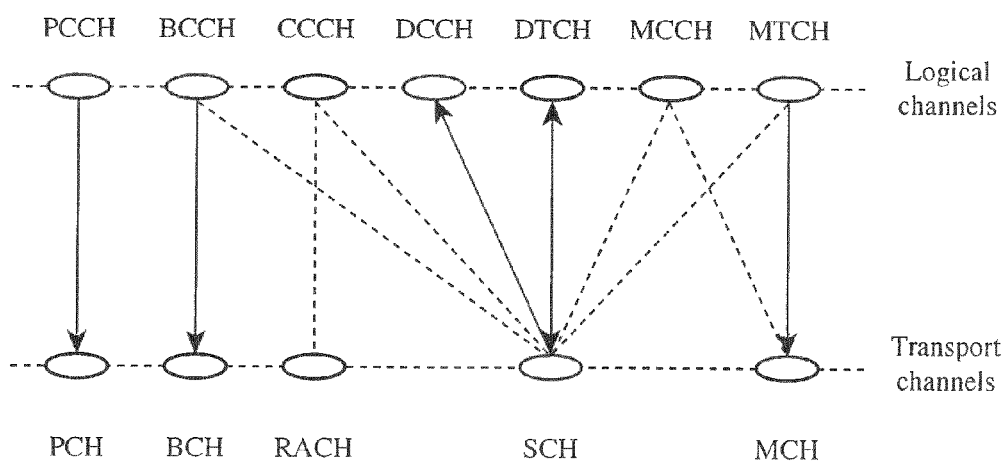
FIG. 2 is an explanatory drawing showing the structure of channels for use in the communication system according to the LTE.

FIG. 2 is an explanatory drawing showing the structure of channels. Mapping of logical channels (Logical channels) and transport channels (Transport channels) is shown in FIG. 2. The logical channels are classified according to the functions and logical characteristics of transmission signals. The transport channels are classified according to transmission forms. A BCCH (Broadcast Control Channel) carries broadcast information. A BCCH is mapped to a BCH (Broadcast Channel) and is transmitted from a base station to mobile terminals. A PCCH (Paging Control Channel) carries information used for processing a call. A PCCH is mapped to a PCH (Paging Channel) and is transmitted from a base station to mobile terminals in the cell of the base station. A DCCH (Dedicated Control Channel) carries individual control data destined for each mobile terminal.

A DTCH (Dedicated Traffic Channel) carries individual user data destined for each mobile terminal. A DCCH and a DTCH are mapped to a DL-SCH (Downlink Shared Channel), and are transmitted individually from a base station to each mobile terminal. In contrast with this, it is individually transmitted from each mobile terminal to a base station by using a UL-SCH (Uplink Shared Channel). A DL-SCH and a UL-SCH are shared channels (Shared Channels). An MCCH (Multicast Control Channel) and an MTCH (Multicast Traffic Channel) carry control data for E-MBMS and user data, respectively, and are mapped to a DL-SCH or an MCH (Multicast Channel) and are transmitted from a base station to a mobile terminal. A connection request signal from a mobile terminal, e.g., a scheduling request signal SR is transmitted from each mobile terminal to a base station by using either a random access channel (Random Access Channel RACH) or a dedicated channel (Dedicated Channel).

Figure 3:
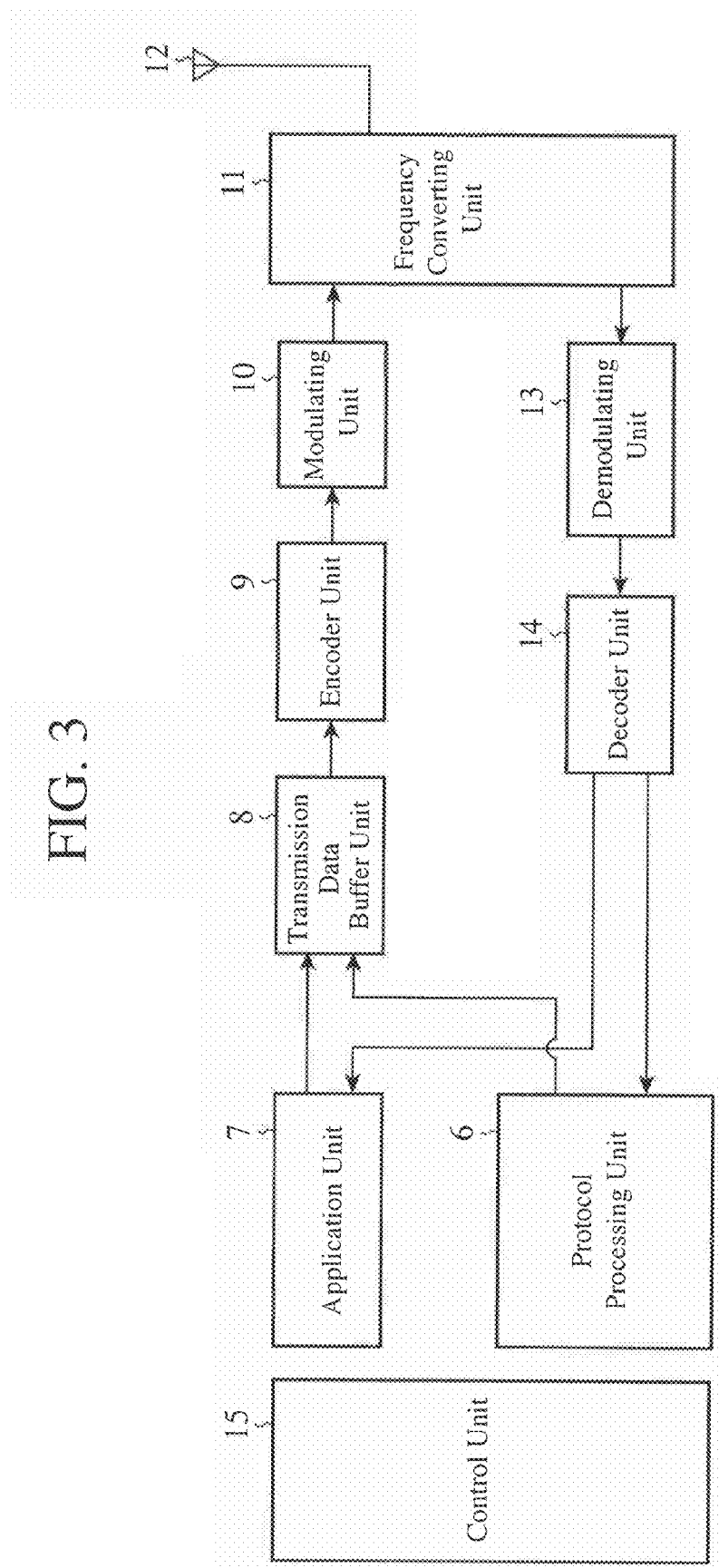
FIG. 3 is a block diagram showing the structure of a mobile terminal.

FIG. 3 is a block diagram showing the structure of a mobile terminal. A transmitting process of the mobile terminal 3 is carried out as follows. First, control data from a protocol processing unit 6 and user data from an application unit 7 are stored in a transmission data buffer unit 8. The data stored in the transmission data buffer unit 8 are delivered to an encoder unit 9, and the encoder unit performs an encoding process, such as an error correction, on the data. There can exist data on which no encoding process is performed and which are directly outputted from the transmission data buffer unit 8 to a modulating unit 10. The modulating unit 10 performs a modulation process on the data on which the encoding process has been performed by the encoder unit 9. After the modulated data are converted into a baseband signal, this baseband signal is outputted to a frequency converting unit 11 and is then converted into a signal having a radio transmit frequency. After that, the transmission signal is transmitted to a base station 2 from an antenna 12.

A receiving process of the mobile terminal 3 is carried out as follows. A radio signal from the base station 2 is received by the antenna 12. The received signal having a radio receive frequency is converted into a baseband signal by the frequency converting unit 11, and a demodulating unit 13 performs a demodulation process on the baseband signal. Data which the demodulating unit obtains after demodulating the baseband signal are delivered to a decoder unit 14, and the decoder unit performs a decoding process, such as an error correction, on the data. Control data among the decoded data are delivered to the protocol processing unit 6, while user data among the decoded data are delivered to the application unit 7. The series of transmission and reception processes of the mobile terminal is controlled by a control unit 15.

Figure 4:
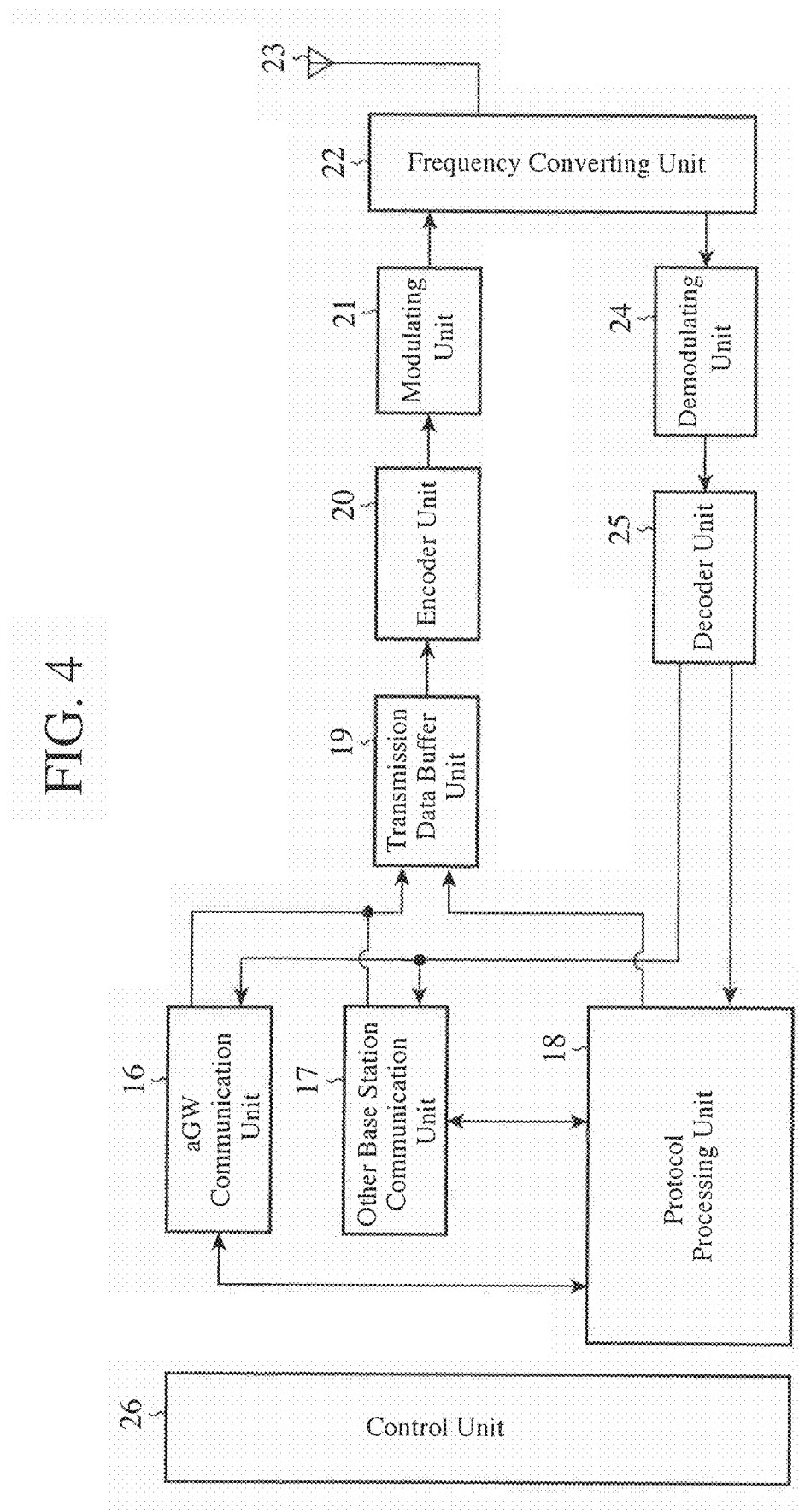
FIG. 4 is a block diagram showing the structure of a base station.

FIG. 4 is a block diagram showing the structure of a base station. A transmitting process of the base station 2 is carried out as follows. An aGW communication unit 16 transmits and receives data between the base station 2 and an aGW 1. An other base station communication unit 17 transmits and receives data to and from another base station. Each of the aGW communication unit 16 and the other base station communication unit 17 receives and sends information from and to a protocol processing unit 18. Control data from the protocol processing unit 18 and user data from the aGW communication unit 16 and the other base station communication unit 17 are stored in a transmission data buffer unit 19. The data stored in the transmission data buffer unit 19 are delivered to an encoder unit 20, and the encoder unit performs an encoding process, such as an error correction, on the data. There can exist data on which no encoding process is performed and which are directly outputted from the transmission data buffer unit 19 to a modulating unit 21. The modulating unit 21 performs a modulation process on the data on which the encoding process has been performed by the encoder unit.

After the modulated data are converted into a baseband signal, this baseband signal is outputted to a frequency converting unit 22 and is then converted into a signal having a radio transmit frequency. After that, the transmission signal is transmitted from an antenna 23 to one or more mobile terminals 1. A receiving process of the base station 2 is carried out as follows. A radio signal from one or more mobile terminals 3 is received by the antenna 23. The received signal having a radio receive frequency is converted into a baseband signal by the frequency converting unit 22, and a demodulating unit 24 performs a demodulation process on the baseband signal. Data which the demodulating unit obtains after demodulating the baseband signal are delivered to a decoder unit 25, and the decoder unit performs a decoding process, such as an error correction, on the data. Control data among the decoded data are delivered to the protocol processing unit 18, and user data among the decoded data are delivered to the aGW communication unit 16 and the other base station communication unit 17. The series of transmission and reception processes of the base station 2 is controlled by a control unit 26.

Hereafter, the operations of a mobile terminal and a base station in accordance with the present invention will be explained. In the 3GPP, persistent scheduling has been studied for, for example, a communication service of voice packet data (VoIP) having, as communication forms, features including a fixed amount, a small amount, periodicity, relatively long-time continuation, and a real-time nature. In a case of dynamic scheduling, the base station and the mobile terminal have to transmit L1/L2 control signals, such as resource allocation and a CQI, for each packet. However, in a case in which dynamic scheduling is used for the above-mentioned service, an L1/L2 control signal is transmitted even though there is neither change in the resource allocation nor change in the CQI information, and therefore the waste of the resources increases. In the persistent scheduling, when the base station transmits resource allocation and a setting of MCS to the mobile terminal once by using an L3 control signal at the time of initial transmission, the base station allocates a resource to the mobile terminal by using the allocation and the MCS during a certain time period, and the mobile terminal transmits an average CQI to the base station once every several receptions of a downlink received signal. Therefore, in the case of persistent scheduling, the volume of traffic of L1/L2 control signals between the base station and the mobile terminal can be reduced. Therefore, it is effective to carry out allocation of radio resources for VoIP data communications as mentioned above in the persistent scheduling.

However, in a case in which communications of VoIP data are carried out, the amount of data communicated during a talk spurt generally differs from that during a silent state. During a silent state, background noise data and so on are transmitted as silent data. These silent data have a smaller amount of data than talk spurt data. For example, in a case of communications of wideband voice data, the amount of silent data is about 1/13 of the amount of talk spurt data, whereas, in a case of communications of narrowband voice data, the amount of silent data is about 1/7 of the amount of talk spurt data. In a case in which persistent scheduling is used for VoIP data communications, when the base station transmits resource allocation to the mobile terminal once at the time of initial transmission, the base station allocates a resource by using the resource allocation during a certain time period. Therefore, when there is a transition from a talk state to a silent state, the resource allocated to the mobile terminal is succeedingly the same as that for talk spurt data even though the amount of data to be transmitted decreases, the mobile terminal enters a state in which the mobile terminal transmits only a smaller amount of data (silent data) than that corresponding to the allocated resource, and a waste of the resources occurs. It is therefore preferable to release resources which are not used in such away that they are allocated to another mobile terminal. In this embodiment, a method of providing a channel exclusive for silent period, and allocating data to be transmitted during a silent state to the channel exclusive for silent period, and a method of releasing resources when making a transition from a talk state to a silent state will be explained.

Figure 7:
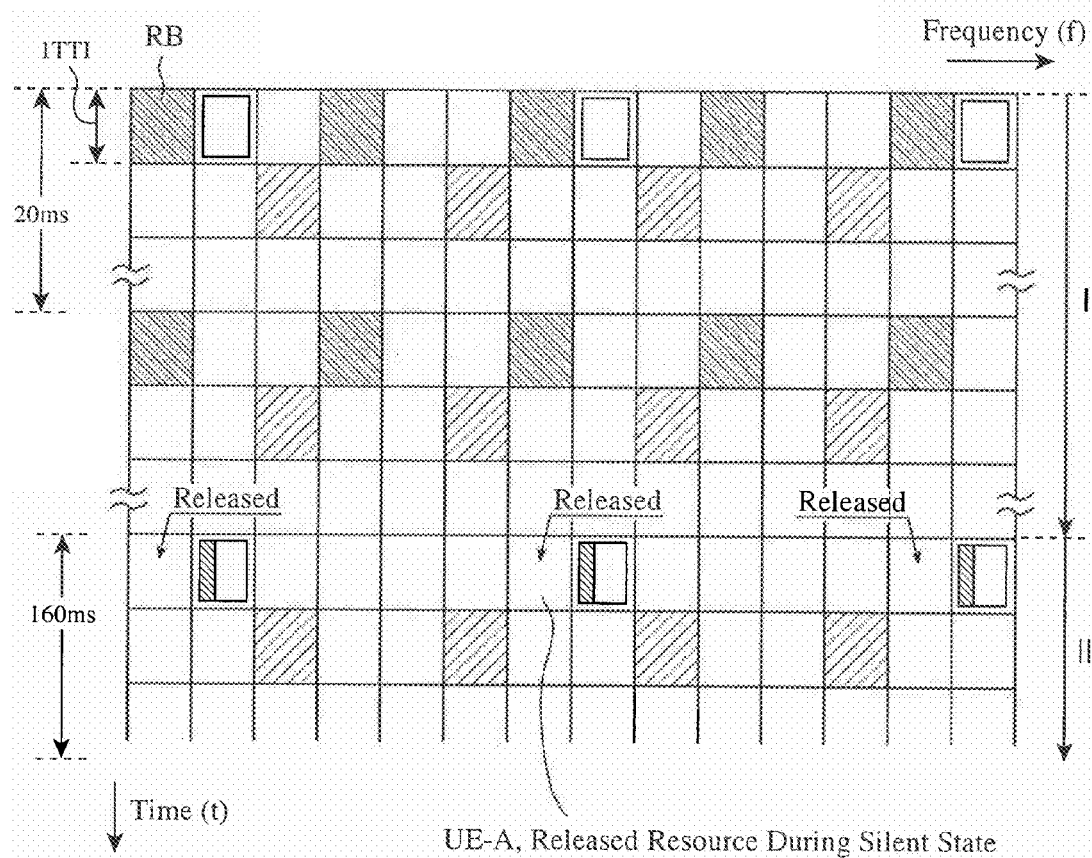
FIG. 7 is an explanatory drawing showing resource allocation for a downlink.

First, the channel exclusive for silent period will be explained. FIG. 7 is an explanatory drawing showing resource allocation for a downlink. In FIG. 7, resource allocation on the frequency and time axes of the channel exclusive for silent period for a downlink is shown. Each open box with a black frame shows a resource block (RB) allocated in the dynamic scheduling, and each open box with a double black frame shows the channel exclusive for silent period to which a resource during a silent period is allocated. Each diagonally shaded box shows a resource to which VoIP data of a certain mobile terminal (a UE-A or a UE-B) is allocated. On the frequency-time axes, a certain region to which data to be transmitted during a silent state of a mobile terminal which is communicating VoIP data are to be allocated for exclusive use is reserved as an exclusive channel in advance (in the present invention, this exclusive channel is called a channel exclusive for silent period). The channel exclusive for silent period is shared by one or more UEs which are communicating VoIP data. Because the amount of data transmitted during a silent state is smaller than that transmitted during a talk spurt, the resources allocated to the channel exclusive for silent period can be reduced compared with those allocated during a talk spurt. Only one channel exclusive for silent period can be shared by all mobile terminals in a silent state, or a plurality of channels exclusive for silent period can be shared by each group of some mobile terminals. In order to make it possible for a plurality of mobile terminals to share one channel exclusive for silent period, as a method of multiplexing signals from the plurality of mobile terminals, frequency division multiplexing, time division multiplexing, or code division multiplexing is used.

In FIG. 7, as an example, a case in which both allocations of resources to a silent period and to a talk spurt are carried out at certain time intervals, and the length of the time intervals is 20 milliseconds transmitted during a talk spurt, whereas the length of the time intervals is 160 milliseconds during a silent period is shown. The figure also shows a case in which a frequency is allocated in a distributed fashion. In this case shown, the method of multiplexing signals from the plurality of mobile terminals onto the channel exclusive for silent period uses frequency division multiplexing. The amount of resources required during a silent period can be predetermined on the basis of the amount of data, such as background noise data. From the amount of resources required during a silent period and the capacity of each of the plurality of mobile terminals, the entire amount of resources of the channel exclusive for silent period and the multiplexing method for use in each of the plurality of terminals can be determined.

Next, a method of allocating talk spurt data and a method of allocating silent data will be disclosed. The base station transmits allocation of radio resources to each of the UE-A and the UE-B by using an L3 control signal at the time of initial transmission through the persistent scheduling. More specifically, the base station transmits information indicating that, as shown in a part of FIG. 7, a resource on the frequency and time axes is allocated to talk spurt data in the downlink at certain time intervals (20 msec) and at frequency intervals (e.g., every three resource blocks) in "distributed" (refer to the explanation of FIG. 6(b)) to each of the mobile terminals (the UE-A and the UE-B). Each of the UE-A and the UE-B accepts the resource allocated by way of the received L3 control signal. When the data from the base station to the UE-A change talk spurt data to silent data, the base station transmits information about a channel exclusive for silent period to the UE-A by using an L1/L2 control signal. In FIG. 7, the resource allocation for an L1/L2 control signal is omitted, though by, for example, allocating an L1/L2 control signal to a number of leading symbols in each TTI to which VoIP data are allocated, each UE can also receive the L1/L2 control signal together with the VoIP data. The UE-A which has received the information about the channel exclusive for silent period also receives some subcarriers which are allocated thereto, as shown in FIG. 7, the subcarriers being included in RBs of the channel exclusive for silent period which is allocated in advance. By using the above-mentioned method, when there is a transition from a talk state to a silent state and resources are allocated to the channel exclusive for silent period, the region which is allocated during a talk spurt can be released for another mobile terminal.

Furthermore, for the inside of each of RBs of the channel exclusive for silent period, as the multiplexing method of multiplexing signals from a plurality of mobile terminal, instead of the above-mentioned frequency division multiplexing, time division multiplexing or code division multiplexing can be used. FIG. 9 is an explanatory drawing for explaining a process of multiplexing signals from a plurality of mobile terminals in an resource block of the channel exclusive for radio period. In FIG. 9, (1) shows a case of using a frequency division multiplexing method. An RB is divided into regions each of which has one or more subcarriers, and the plurality of regions are allocated to the plurality of mobile terminals, respectively. The required number of subcarriers in each region depends upon the number of RBs of the channel exclusive for silent period. The total number of subcarriers allocated to each mobile terminal is acquired by performing a multiplication of the number of subcarriers in each region and the number of RBs of the channel exclusive for silent period, and this total number of subcarriers has only to be determined in such a way as to satisfy a required amount of silent data, such as background noise data. A case in which each RB is divided into six regions is shown, as an example, in the figure. In the figure, (2) shows a case of using a time division multiplexing method. Each TTI is divided into regions in units of a subframe, a ½ subframe, or a symbol, and the plurality of regions are allocated to the plurality of mobile terminals, respectively. A case in which each TTI is divided into regions in units of a ½ subframe, and the plurality of regions are allocated to the plurality of mobile terminals, respectively is shown in the figure. In this embodiment and subsequent Embodiments 2, 3 and 4, each TTI consists of two subframes (i.e., ½ TTI consists of one subframe). As an alternative, each TTI can consist of several subframes. In the figure, (3) shows a case of using a code division multiplexing method. Multiplexing is carried out by using per-UE codes provided to the plurality of UEs. Each of these codes can be a scrambling code or a spread code. Each of these codes can alternatively be a UE-ID, or a CAZAC code which is used for an uplink Ack/Nack channel. In the case of using the code division multiplexing, because each RB does not have to be further divided into parts, there is provided an advantage of being able to reduce the number of RBs of the channel exclusive for silent period compared with the case of using the frequency division multiplexing or the time division multiplexing, thereby increasing the amount of reduction in the waste of the frequency-time resources. Furthermore, in the example of FIG. 7, resources are allocated in units of an RB as the channel exclusive for silent period. As an alternative, allocation of resources can be carried out in units of a subcarrier, a virtual RB, or a ½ TTI. In either of these cases, there is provided an advantage of being able to carry out allocation of resources in units of a smaller resource unit than units of an RB, thereby increasing the amount of reduction in the waste of the frequency-time resources.

In accordance with the present invention, the resources have parameters for using a channel exclusive for silent period, and these parameters are notified from the base station to mobile terminals. The parameters include parameters showing the structure of the channel exclusive for silent period, and a parameter showing which part of the channel exclusive for silent period is used (whether or not silent data allocation will be performed). As the parameters showing the structure of the channel exclusive for silent period, there are, for example, parameters showing frequency region allocation indicating to which frequency region silent data are allocated, parameters showing time region allocation indicating to which time region the silent data are allocated, and a parameter showing a multiplexing method. As the parameters showing frequency region allocation, there are, for example, an RB number (which is numbered in units of an RB from the lowest frequency of the system band), and, in the case of using the frequency division multiplexing method, the number of divisions of each RB, and so on. As the parameters showing time region allocation, there are, for example, a TTI number (which is numbered in units of a TTI with reference to a certain time), a parameter indicating a time interval allocated repeatedly, and, in the case of using the time division multiplexing method, the number of divisions of each TTI, and so on. A different parameter value is set to the parameter showing a multiplexing method according to which one of the frequency division multiplexing, the time division multiplexing, and the code division multiplexing is used as the multiplexing method. As the parameter showing which part of the channel exclusive for silent period is used (i.e., to which part of the channel exclusive for silent period silent data are allocated), there is, for example, in the case of using the frequency division multiplexing, a number given to each divided frequency region in an RB, in the case of using the time division multiplexing, a number given to each divided time region in a TTI, or, in the case of using the code division multiplexing, a code which is individually provided to each UE.

Figure 8:
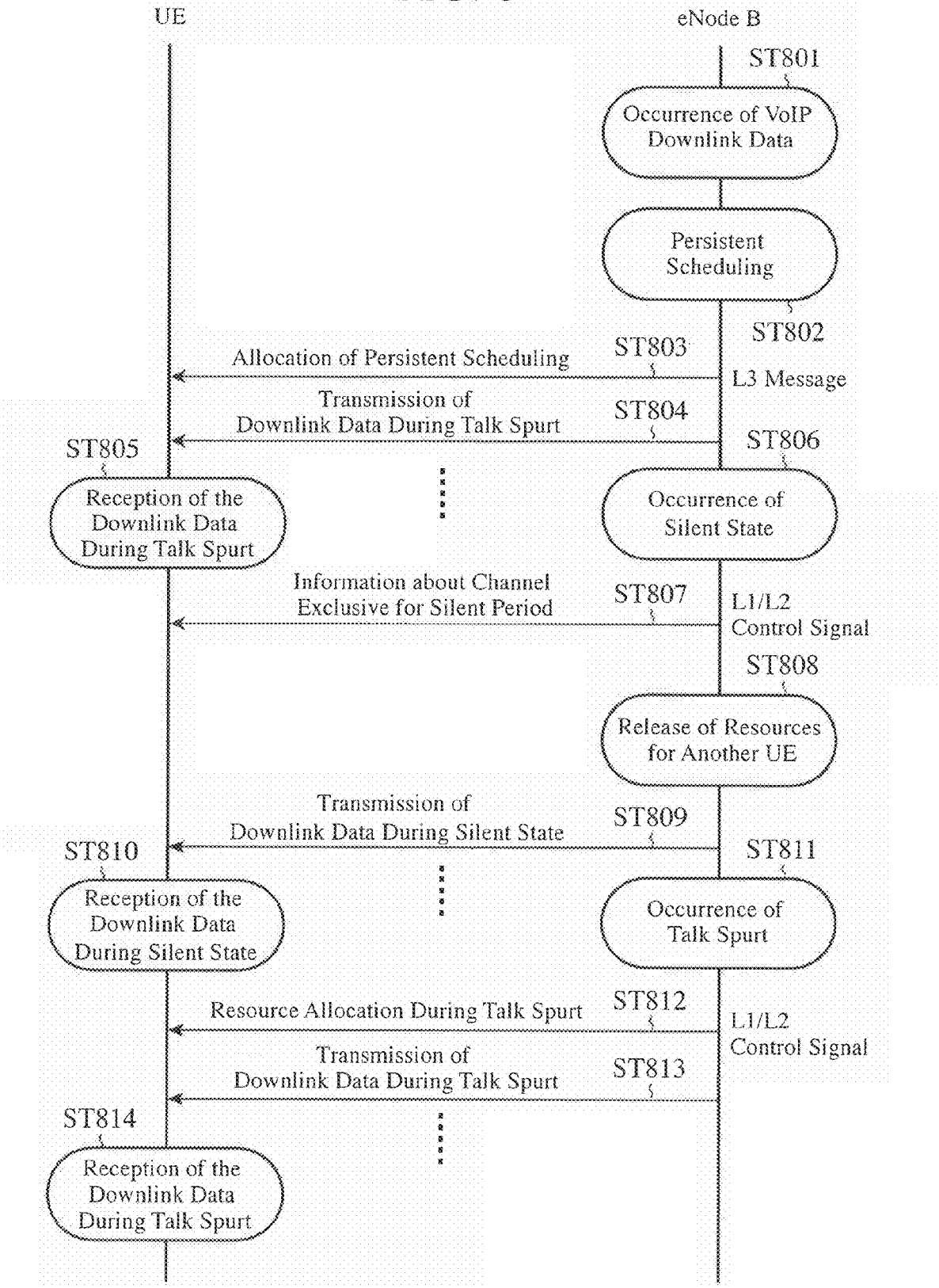
FIG. 8 is a flow chart showing processes of a communication method in accordance with Embodiment 1 of the present invention.

FIG. 8 is a flow chart showing processes of the communication method in accordance with Embodiment 1 of the present invention. A series of operations in persistent scheduling when VoIP downlink data occur is shown in FIG. 8. When VoIP downlink data destined for a mobile terminal occur (ST801), the schedulers of the base station carries out persistent scheduling (ST802). After that, the base station transmits information about resource allocation and MCS setting information for the persistent scheduling to the mobile terminal by using an L3 control signal (an L3 message) (ST803). After that, the base station transmits data to be transmitted during a talk spurt (ST804). Because, by receiving the resource allocation information and the MCS setting information using the L3 message, the mobile terminal can know the resource allocation of data to be transmitted during a talk spurt which are persistent-scheduled, the mobile terminal can receive the data transmitted during a talk spurt (ST805).

Next, because, when a silent state occurs (ST806), the base station makes a transition from the talk state to the silent state, the base station notifies information about a channel exclusive for silent period to the mobile terminal by using an L1/L2 control signal (ST807). The information about the channel exclusive for silent period consists of the parameters for using the channel exclusive for silent period. The parameters for using the channel exclusive for silent period are mentioned above. By receiving this information about the channel exclusive for silent period, the mobile terminal can know the structure of the channel exclusive for silent period, and to which part of the channel exclusive for silent period data to be transmitted during a silent state which the mobile terminal will receive are allocated, and therefore can receive silent data (ST809 and ST810). After allocating downlink data to be transmitted during a silent state, which are destined for the mobile terminal, to the channel exclusive for silent period, the base station releases for another mobile terminal the resources which the base station has allocated to a talk spurt for the mobile terminal (ST808).

When talk spurt data occur again (ST811), the base station notifies resource allocation information to the mobile terminal by using an L1/L2 control signal (ST812), and then transmits the data to be transmitted during a talk spurt to the mobile terminal according to the information (ST813). The resource allocation information can be the same as or differ from that about the resource allocation during a talk state before the silent state occurred. The base station can determine the resource allocation information according to the scheduling status or the channel quality status at that time. The mobile terminal which has received the resource allocation information by using the L1/L2 control signal can know the resource allocation of the data to be transmitted during a talk spurt, and can therefore receive the data transmitted during the talk spurt again (ST814).

In the case in which persistent scheduling is used for communications of VoIP data, as disclosed in this embodiment, by using the method of newly disposing a channel exclusive for silent period during a silent state, and allocating data to be transmitted during a silent state to the channel exclusive for silent period when making a transition from a talk state to a silent state, it is possible to release useless resource allocation which is caused by reduction in the amount of transmission silent data in such a way that the resource allocation can be allocated to another UE. In general, the provision of an exclusive channel causes a waste of the resources, though, according to the present invention, there is provided an advantage of, by disposing a channel exclusive for silent period with a small amount of data, and then releasing resources with a large amount of data which have been allocated to a talk spurt, being able to reduce the useless allocation of resources in the system, and perform efficient allocation of resources. Therefore, the throughput of the system can be improved. Furthermore, because the channel exclusive for silent period is disposed, there is provided an advantage of preventing the system from entering a state in which the resources cannot be reserved when making a transition from a talk state to a silent state, thereby preventing data from being delayed and lost.

In this embodiment, the case in which resources are allocated in a "distributed" fashion (refer to the explanation of FIG. 6 (*b*)) is shown. As an alternative, resource allocation can be performed in a "localized" fashion (refer to the explanation of FIG. 6 (*a*)), and the present invention can also be applied to this case. Resource allocation accompanied by frequency hopping can be alternatively carried out, and the present invention can also be applied to this case. Furthermore, the case of downlink transmission is shown in this embodiment. The present invention can also be applied to uplink transmission.

Embodiment 2

In above-mentioned Embodiment 1, the method of disposing a channel exclusive for silent period for transmission of silent data, and allocating the data to be transmitted during a silent state to the channel exclusive for silent period is disclosed. In contrast, in this Embodiment 2, a method of allocating data to be transmitted during a silent state to a part of resources on a frequency axis which was allocated during a talk spurt without disposing any channel exclusive for silent period will be disclosed.

Figure 10:
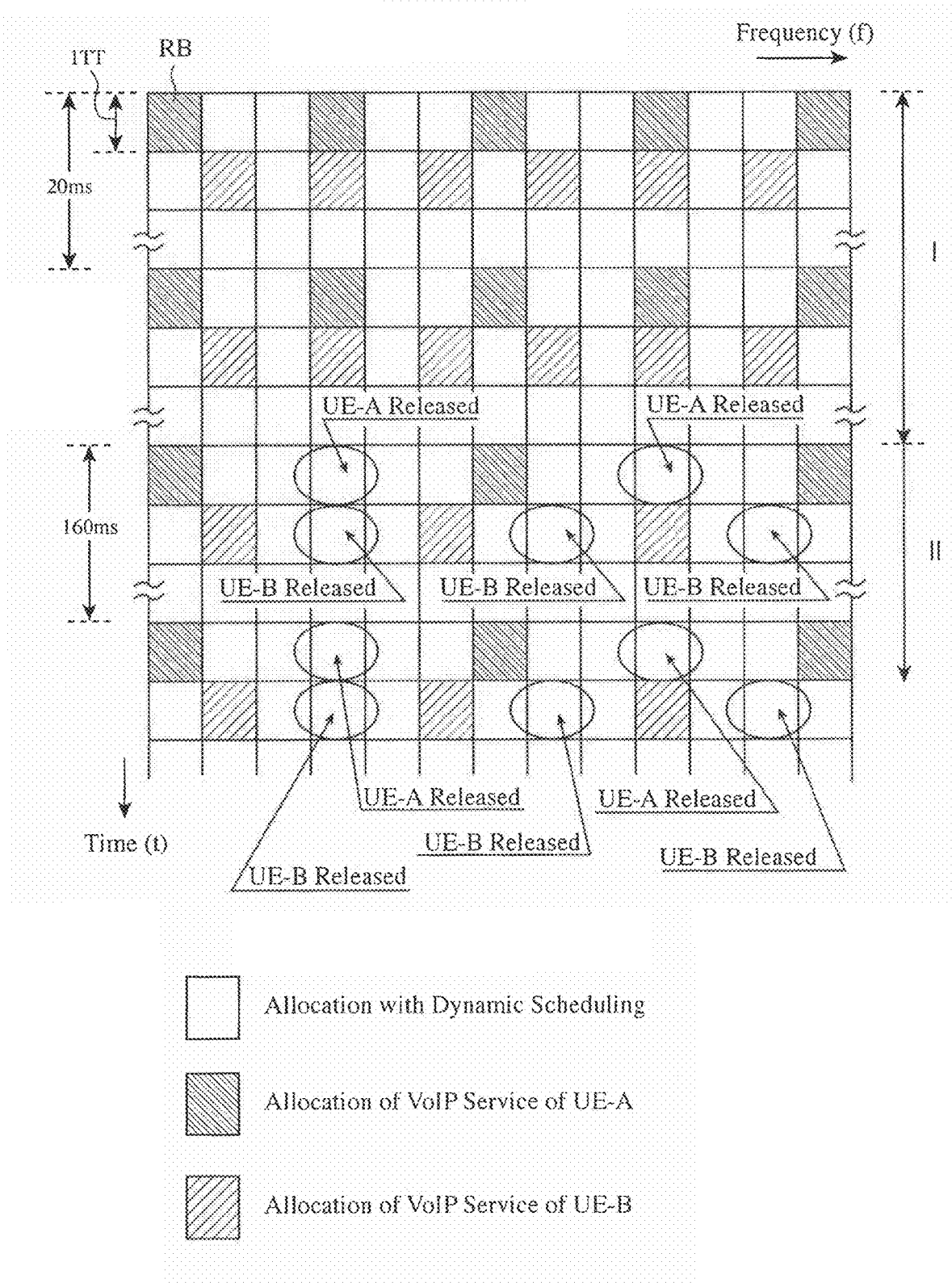
FIG. 10 is an explanatory drawing showing resource allocation for a downlink.

FIG. 10 is an explanatory drawing showing resource allocation for a downlink. The method of allocating a part of resources on the frequency axis, which was allocated during a talk spurt, during a silent state for a downlink is shown in FIG. 10. Each open box with a black frame shows a resource block (RB) which is allocated in dynamic scheduling, and each diagonally shaded box shows a resource to which a VoIP service of a certain mobile terminal (for example, the UE-A or the UE-B) is allocated. During a talk spurt (I), some regions on the frequency-time axes are allocated for data transmission of each of the UE-A and the UE-B. In this variant, a case in which the VoIP service of each of the UE-A and the UE-B is allocated in a "distributed" fashion in units of RBs on the frequency axis (refer to the explanation of FIG. 6 (*b*), and the allocation is carried out in units of 3 RBs for the UE-A and the allocation is carried out in units of 2 RBs for the UE-B) is shown. Furthermore, the length of time intervals at which the allocation is carried out is 20 milliseconds. In the present invention, when the base station makes a transition to a silent state (II), a part of the resources on the frequency axis which have been allocated during a talk spurt is allocated as resources for data to be transmitted during a silent state. According to this embodiment, for example, the VoIP service of each of the UE-A and the UE-B is allocated to resources in a distributed fashion in units of RBs every other RB in the allocation during a talk spurt. By doing in this way, the base station can release for another UE excessive resource regions which are not used. The amount of resources required during a silent period can be predetermined on the basis of the amount of data, such as background noise data.

In accordance with the present invention, the resources which are used for data to be transmitted during a silent state have a parameter indicating a part of the resources on the frequency axis which have been allocated during a talk spurt, and this parameter is notified from the eNB to the UE. As this parameter, there is, for example, an RB number.

In this Embodiment 2, in the series of operations performed by the UE and the eNB in the persistent scheduling when VoIP downlink data occurs, information about the resource allocation during a silent state has only to be transmitted instead of information about allocation of a channel exclusive for silent period which the eNB transmits to the UE by using an L1/L2 control signal after a silent state has occurred, in the sequence of FIG. 8 shown in Embodiment 1. The information about the resource allocation during a silent state consists of the above-mentioned parameter indicating a part of the resources on the frequency axis which have been allocated during a talk spurt. The UE which has received this parameter can know the resources to which downlink data to be transmitted during a silent state are allocated, and can therefore receive the downlink data transmitted during a silent state. After allocating the downlink data to be transmitted during a silent state to the UE, the eNB releases for another UE resources which are not used during a silent state among the resources which have been allocated to a talk spurt for the UE.

As disclosed in this Embodiment 2, by using the method of, when the base station makes a transition from a talk state to a silent state, allocating a part of the resources on the frequency axis which have been allocated during the talk spurt without disposing any channel exclusive for silent period, the system makes it possible to reduce useless resource allocation which is caused by the reduction in the amount of transmission data, and to release the reduction in the resource allocation in such a way that it can be allocated to another UE. Therefore, there is provided an advantage of being able to perform efficient allocation of resources. Furthermore, it is not necessary to dispose a channel exclusive for silent period for transmission of data during a silent state in advance, and useless resource allocation which is caused by existence of free space in the channel exclusive for silent period can be reduced and therefore the reduction in the resource allocation in such a way that it can be allocated to another UE. Therefore, there is provided an advantage of being able to perform efficient allocation of resources. Accordingly, the throughput of the system can be improved. In addition, because a part of the resources on the frequency axis which have been allocated during a talk spurt is allocated, there is provided an advantage of preventing the system from entering a state in which the resources cannot be reserved when the base station makes a transition from the talk state to a silent state, thereby preventing data from being delayed and lost.

Figure 12:
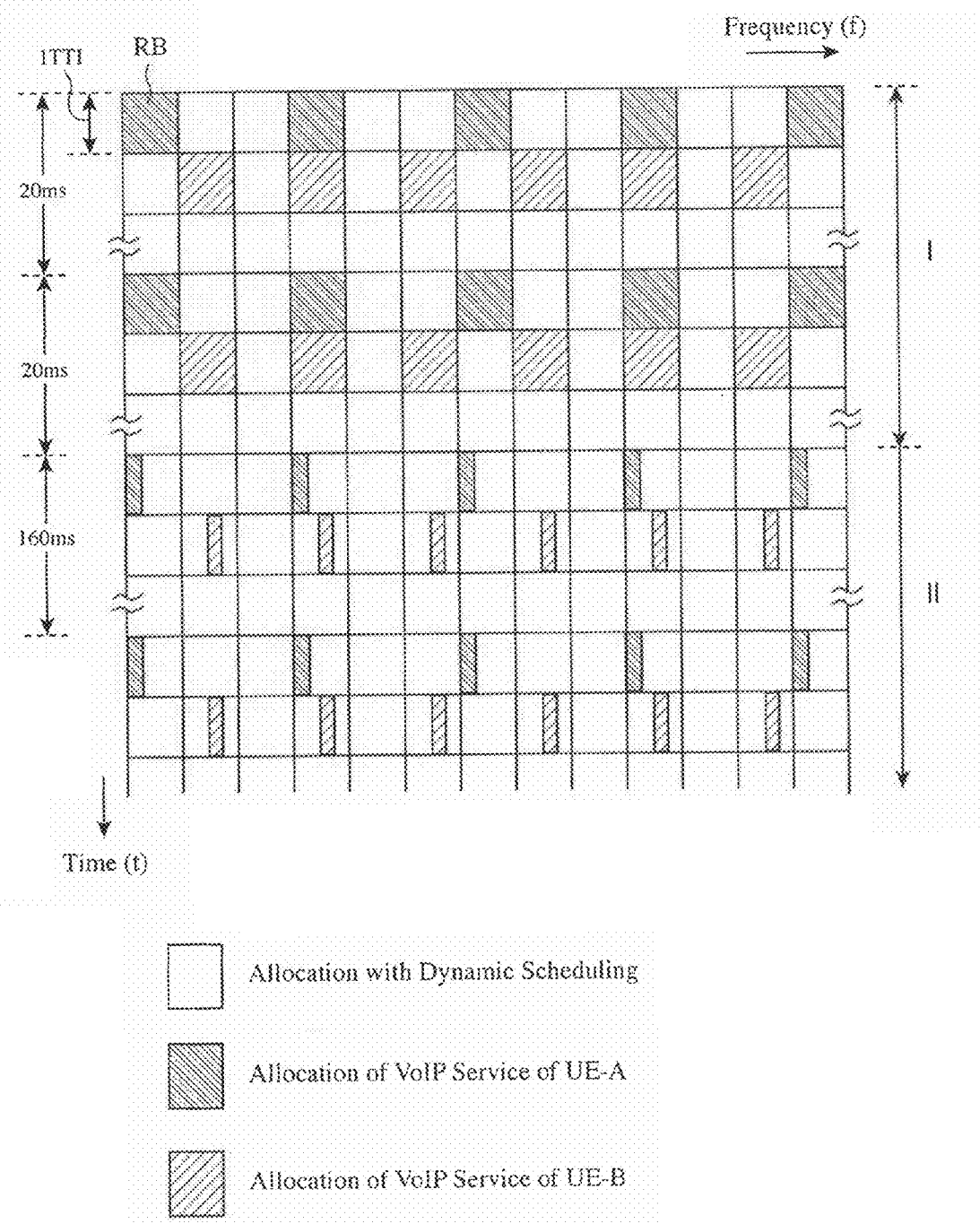
FIG. 12 is an explanatory drawing showing resource allocation for a downlink.

Hereafter, variants will be explained. As a first variant, there is disclosed a method of allocating a part of the resources on the frequency axis which have been allocated during a talk spurt to data to be transmitted during a silent state in units of one or more subcarriers, without disposing any channel exclusive for silent period. In accordance with Embodiment 2, a part of resources on the frequency axis which have been allocated during a talk spurt is allocated in units of an RB, and is then released for another UE. In accordance with this variant, the part of the resources on the frequency axis is allocated in units of one or more subcarriers, and is then released for another UE. In the variant shown in FIG. 12, the part of the resources on the frequency axis is allocated to three subcarriers included in each RB which is allocated to each of the UE-A and the UE-B in a distributed fashion. By doing in this way, the system can release for another UE an excessive resource region which is not used. The amount of resources required during a silent period can be predetermined on the basis of the amount of data, such as background noise data.

In accordance with the present variant, the resources which are used for data to be transmitted during a silent state have parameters indicating the part of the resources on the frequency axis which have been allocated during a talk spurt, and these parameters are notified from the eNB to the UE. As the parameters, there are, for example, the number of divisions of each RB, and a number indicating each divided region. Units in which data to be transmitted during a silent state are allocated to the part of the resources on the frequency axis which have been allocated during a talk spurt are the ones of an RB in Embodiment 2, whereas in the variant 1, they are the ones of one or more subcarriers. Furthermore, even when data to be transmitted during a silent state can be allocated to the part of the resources on the frequency axis in units of a VRB (Virtual Resource Block), the same advantages can be provided. For example, a part of a VRB which was allocated during a talk spurt can be allocated during a silent state. Furthermore, these allocation methods can be combined, and this combination can offer the same advantages. For example, a part of an RB which was allocated during a talk spurt can be further allocated in units of a subcarrier. This variant offers an advantage of being able to reduce the size of units in which allocation of data to be transmitted during a silent state is carried out, and to allocate the data to a region having a wide band on the frequency axis, thereby achieving a frequency diversity gain.

Figure 11:
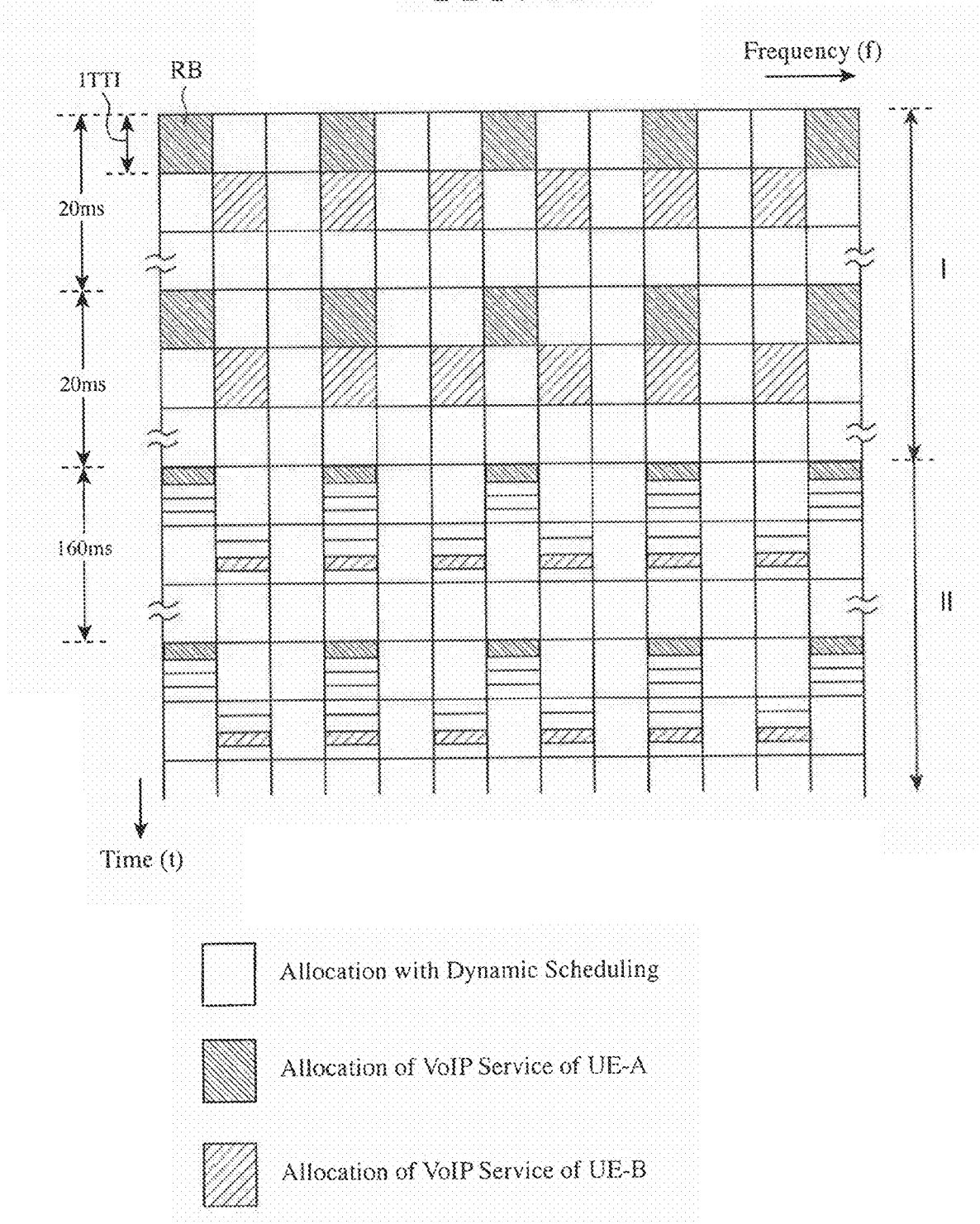
FIG. 11 is an explanatory drawing showing resource allocation for a downlink.

As a second variant, there is disclosed a method of allocating data to be transmitted during a silent state to a part of the resources on the time axis which have been allocated during a talk spurt, without disposing any channel exclusive for silent period during a silent state. In the variant shown in FIG. 11, each TTI is divided into four parts in units of a ½ subframe, and a ½ subframe among an RB which has been allocated during the talk spurt is allocated to each of a UE-A and a UE-B. By doing in this way, the system can release for another UE an excessive resource region which is not used. The amount of resources required during a silent period can be predetermined on the basis of the amount of data, such as background noise data. In accordance with the present variant, there are provided parameters indicating a part of the resources on the time axis which have been allocated during a talk spurt, which are used for data to be transmitted during a silent state, and these parameters are notified from the eNB to the UE. As the parameters, there are, for example, the number of divisions of each TTI and a number showing each divided region. This variant offers an advantage of being able to reduce the size of units in which allocation of data to be transmitted during a silent state is carried out, and to allocate the data to a region having a wide band on the frequency axis, thereby achieving a frequency diversity gain, like the first variant.

Embodiment 3

In the nonpatent reference 5, the use of frequency hopping in uplink (UL, Uplink) data transmission for which persistent scheduling is carried out is studied. However, nothing about a concrete hopping method of implementing frequency hopping is disclosed in the nonpatent reference 5. Therefore, nothing about a method of controlling frequency hopping is disclosed in the nonpatent reference 5. In this Embodiment 3, a concrete hopping method of implementing frequency hopping will be explained. In order to use frequency hopping in transmission of uplink data for which persistent scheduling is performed, it is preferable that a mobile terminal (UE) and a base station (eNB, eNodeB) share control of the frequency hopping. In this case, a further advantage can be provided. Unless the mobile terminal and the base station share control of the frequency hopping, the base station has to allocate uplink radio resources to the mobile terminal every time when frequency hopping is carried out, and has to transmit and receive L1/L2 control signals for allocation. In contrast, when the mobile terminal and the base station share control of the frequency hopping, there is provided a further advantage of eliminating the necessity for the base station to transmit and receive an L1/L2 control signal for allocation. Therefore, in accordance with this Embodiment 3, a concrete hopping method of implementing frequency hopping and a control method required for the frequency hopping are suggested, and a method of making a mobile terminal and a base station share the control method appropriately is further suggested.

Figure 13:
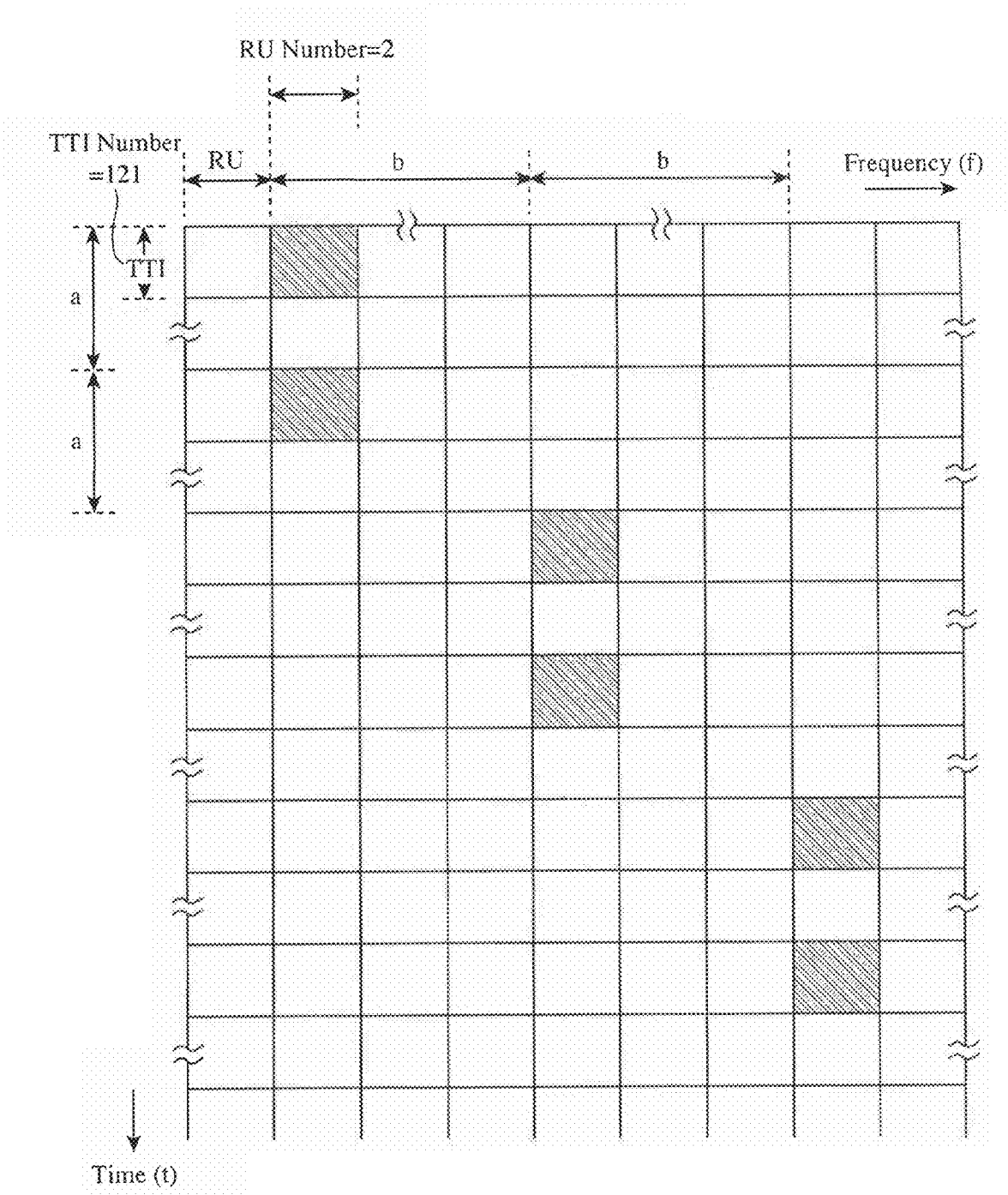
FIG. 13 is an explanatory drawing showing radio resource allocation at a time of frequency hopping in Embodiment 3.

Allocation of radio resources at a time of frequency hopping when transmission of uplink data for which persistent scheduling is performed is carried out is shown in FIG. 13. The allocation shown in FIG. 13 will be explained hereafter. FIG. 13 shows the allocation in a distributed fashion. In persistent scheduling, allocation of radio resources is carried out at fixed time intervals. Regular time intervals at which radio resources are allocated are referred to as "persistent intervals" from here on. In FIG. 13, the persistent intervals are designated by a. When VoIP which are coded with AMR are persistent-scheduled, the length of the persistent intervals is equal to 20 milliseconds. In FIG. 13, uplink radio resources are allocated to a mobile terminal at fixed time intervals which are the persistent intervals a. In the allocation which is carried out at the persistent intervals, one resource unit is allocated during each TTI interval, as illustrated as an example in the figure. In Embodiment 3, a method of carrying out frequency hopping on the time axis at time intervals having a length which is N times that of the persistent intervals, and carrying out frequency hopping a certain number of resource units (RU) on the frequency axis is suggested as the frequency hopping method. In FIG. 13, an example in which hopping on the time axis is carried out at time intervals having a length which is 2 times (N=2) that of the persistent intervals, and hopping on the frequency axis is carried out every b resource units is illustrated.

As setting parameters required in order to control the hopping shown in FIG. 13, there are "N" indicating that hopping is carried out at time intervals having a length which is N times that of the persistent intervals, "b" indicating a certain number of resource units which frequency hopping is carried out, a "time offset" indicating a time starting point (Starting point) at the time of using the frequency hopping, and a "frequency offset" indicating a frequency starting point of a resource unit at the time of using the frequency hopping.

As a concrete setting method of setting the time offset, there can be considered (1) a method of setting the time offset from time information which the mobile terminal and the base station share, and (2) a method of setting the time offset from time information which the mobile terminal and the base station determine according to a predetermined rule. As the time information shown in (1) which the mobile terminal and the base station share, there can be considered a frame number (which is numbered in units of a frame with reference to a certain time), a TTI number (which is numbered in units of a TTI with reference to a certain time), or the like. In FIG. 13, the time offset is the TTI number of 121. Furthermore, the setting of the time offset shown in (2) can be made according to the following equation:

$$\text{Mod}(\text{TTI number}/(\text{time length of persistent intervals}/\text{time length of } 1 \text{ TTI} \times N)) = \text{Time offset}$$

where when the time length of the persistent intervals is 20 milliseconds, the time length of 1 TTI is 1 millisecond, and N is 2, the time offset is equal to 1. In the above-mentioned equation for determining the time offset, the TTI number in the numerator can be replaced by any time information which the mobile terminal and the base station share. For example, a frame number or the like can be used instead. In this case, what is necessary in the denominator of the equation is just to determine a number of frames every which the frequency hopping is carried out on the basis of frame numbers.

The time information (a TTI number) which the mobile terminal and the base station share is determined by using the above-mentioned equation. Assuming that the time length of the persistent intervals is 20 milliseconds, the time length of 1 TTI is 1 millisecond, N is 2, and the time offset is 1 as FIG. 13, the TTI numbers which satisfy the above-mentioned equation are "41, 81, 121, 161, 201, and 241." When the time offset is set to 1 as the setting parameter for controlling the frequency hopping, each of the mobile terminal and the base station calculates the TTI numbers which satisfy the equation to obtain "41, 81, 121, 161, 201, and 241." The mobile terminal and the base station set up the above-mentioned TTI numbers, and starts the frequency hopping from a TTI number in the setting values which they reach after the expiration of "a certain time (can be a predetermined value or a value which is set up by the base station)" (a starting point at the time of using the frequency hopping).

The frequency offset set by using a concrete setting method of setting the frequency offset has to be frequency information which the mobile terminal and the base station share. Concretely, a number which is numbered in units of a resource unit from the lowest frequency of the system band (a resource unit number or an RU number) or the like can be used. In FIG. 13, the RU number is 2. The above-mentioned control method, i.e., the method of making the mobile terminal and the base station share setting parameters etc. will be explained with reference to FIG. 14. The base station, in ST1401, performs uplink persistent scheduling. The base station, in ST1402, notifies the mobile terminal of allocation of the uplink persistent scheduling to the mobile terminal. The mobile terminal, in ST1403, receives the allocation of the uplink persistent scheduling. The mobile terminal, in ST1404, transmits uplink data according to the allocation of the uplink persistent scheduling which the mobile terminal has accepted. The base station, in ST1405, receives the uplink data from the mobile terminal. The base station, in ST1406, notifies settings (setting parameters etc.) of frequency hopping to the mobile terminal. The base station can use an L1/L2 control signal or the like for this notification. The mobile terminal, in ST1407, receives the settings (setting parameters etc.) of frequency hopping. This sequence of ST1406 and ST1402 is arbitrary. The mobile terminal, in ST1408, transmits uplink data according to both the settings of frequency hopping which the mobile terminal received in ST1407, and the allocation of the uplink persistent scheduling which the mobile terminal accepted in ST1403. The base station, in ST1409, receives the uplink data from the mobile terminal.

This Embodiment 3 can offer the following advantages. In accordance with this Embodiment 3, the concrete frequency hopping method for use in persistent scheduling is suggested, and the control method of controlling the frequency hopping is suggested together with the concrete frequency hopping method. As a result, there is provided an advantage of being able to implement communications resistant to frequency phasing by using the frequency hopping in a status in which no scheduling using the communication path quality (CQI) is used for some reasons. By the way, as a representative case of not using scheduling using the CQI, there can be considered persistent scheduling and scheduling for a mobile terminal which is moving at a high speed. In persistent scheduling, because periodic resource allocation is scheduled, dynamic scheduling is not used in order to reduce L1/L2 control signals used for frequent radio resource allocations. In scheduling for a mobile terminal which is moving at a high speed, because the mobile terminal is moving at a high speed, it is expected that the difference between the reported communication path quality and the communication path quality at the current location of the mobile terminal is large. Therefore, it can be considered that no scheduling using the communication path quality (CQI) reported from the mobile terminal to the base station is carried out. Because the previously-explained method enables reception and transmission to be carried out by using many frequencies, communications further resistant to frequency phasing can be implemented. In other words, especially in the case in which no scheduling using the CQI is used (in the case in which persistent scheduling is carried out and in the case in which scheduling is carried out for a mobile terminal which is moving at a high speed), Embodiment 3 can provide an effective means.

This Embodiment 3 also suggests the method of making the mobile terminal and the base station share the control method of controlling the frequency hopping appropriately. As a result, there is provided an advantage of eliminating the necessity for the base station to allocate uplink radio resources to the mobile terminal every time when the frequency hopping is performed. Therefore, L1/L2 control signals with which the base station notifies the control method of controlling the frequency hopping (the setting parameters etc.) to the mobile terminal can be reduced. That is, the system can make effective use of the downlink radio resources. This results in improvement in the downlink throughput of the whole system. The unnecessity of allocation of uplink radio resources to the mobile terminal from the base station every time when the frequency hopping is performed is important especially in the purpose of persistent scheduling of reducing L1/L2 control signals. In addition, there can be provided the following advantages by using the concrete frequency hopping method as shown in this Embodiment 3 in persistent scheduling. First, because in consideration of the communication quality which is requested of data which are communicated between each of a plurality of mobile terminals which are persistent-scheduled and the base station, a concrete frequency hopping pattern as shown in this Embodiment 3 is allocated to the plurality of mobile terminals, there is provided an advantage of being able to provide optimal communication quality for each of the plurality of mobile terminals which are persistent-scheduled with stability. Furthermore, even when a path (communication path) loss or path variation occurs due to a distance fluctuation of a mobile terminal which is moving, but is not necessarily moving at a high speed, the communication quality is hard to be affected. Therefore, there is provided an advantage of being able to eliminate the necessity to change the parameters of the resource allocation, the modulating method, and the error correction coding by way of L1/L2 control signals to maintain the communication path quality in the course of communications, thereby greatly reducing the amount of information and frequency of control signals in the course of communications in persistent scheduling.

Figure 15:
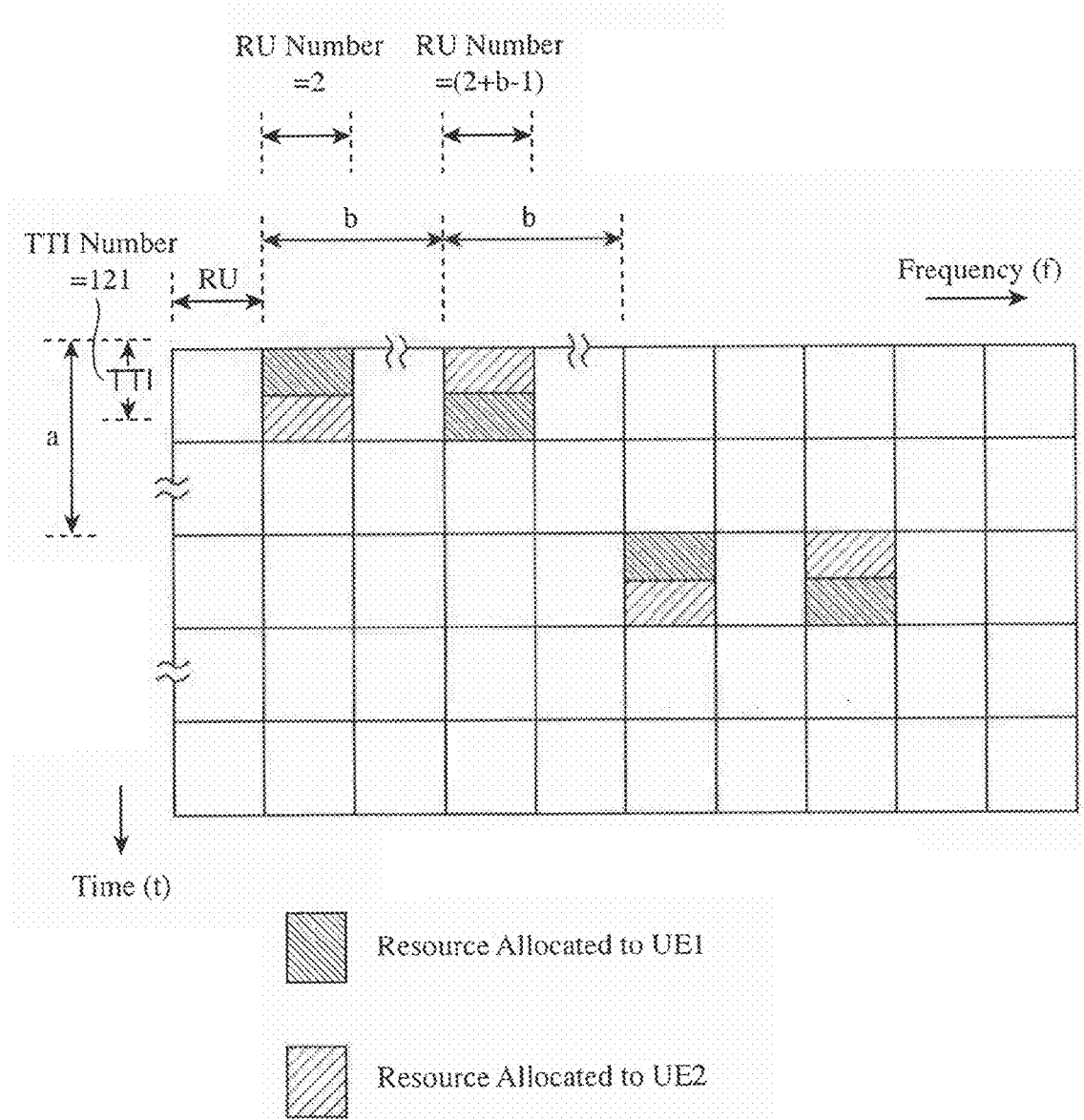
FIG. 15 is an explanatory drawing showing resource allocation for an uplink.

A first variant of Embodiment 3 will be explained hereafter. Allocation of radio resources at the time when frequency hopping is performed during transmission of uplink data for which persistent scheduling is performed is shown in FIG. 15. The allocation shown in FIG. 15 will be explained hereafter. FIG. 15 shows the allocation in a distributed fashion. The persistent intervals are designated by a. In FIG. 15, uplink radio resources are allocated to a mobile terminal at fixed time intervals which are the persistent intervals a. The allocation at the persistent intervals is carried out in such a way that one resource unit is allocated in units of one TTI, as illustrated as an example. In the variant of Embodiment 3, a method of carrying out frequency hopping on the time axis in units of a subframe unit and at the persistent intervals, and carrying out frequency hopping on the frequency axis a certain number of resource units is suggested as the frequency hopping method. FIG. 15 shows an example of hopping b resource units in units of a subframe.

Setting parameters, as shown in FIG. 15, required in order to control the hopping include "b" indicating resource units which are hopped, a "time offset," and a "frequency offset." Resource units which are hopped intra TTI can be set to have a resource unit value b different from that of resource units which are hopped at the persistent intervals. Furthermore, a parameter for identifying, as shown in FIG. 15, whether either a pattern of UE1 (e.g., in the first half of a subframe, 2 is used as the RU number, and in the second half of the subframe, (2+b−1) is used as the RU number) or a pattern of UE2 (e.g., in the first half of a subframe, (2+b−1) is used as the RU number, and in the second half of the subframe, 2 is used as the RU number) is used is also required. As a concrete example, there is provided a method of generating a parameter indicating "0" in a case in which a lower frequency side is used in the first half of a subframe, or "1" in a case in which a higher frequency side is used in the first half of a subframe.

Because the concrete setting method of setting the time offset and the concrete setting method of setting the frequency offset are the same as those shown in Embodiment 3, the explanation of these methods will be omitted hereafter. Because the above-mentioned control method, i.e., the method of making the mobile terminal and the base station share setting parameters etc. is the same as that shown in Embodiment 3, the explanation of the method will be omitted hereafter. The first variant can provide an advantage as will be explained below in addition to the previously-explained advantages provided by Embodiment 3. More specifically, by using the frequency hopping within a time interval shorter than one TTI, the frequency hopping is used in a resource which is allocated once at the persistent intervals. As a result, it is possible to prevent all data within one TTI, i.e., all data in a resource which is allocated once at the persistent intervals from being allocated to a frequency having bad quality in terms of frequency characteristics. Therefore, there is provided an advantage of being able to implement communications further resistant to frequency phasing, to prevent occurrence of receiving errors (CRC errors), and to improve the throughput of the system.

Figure 16:
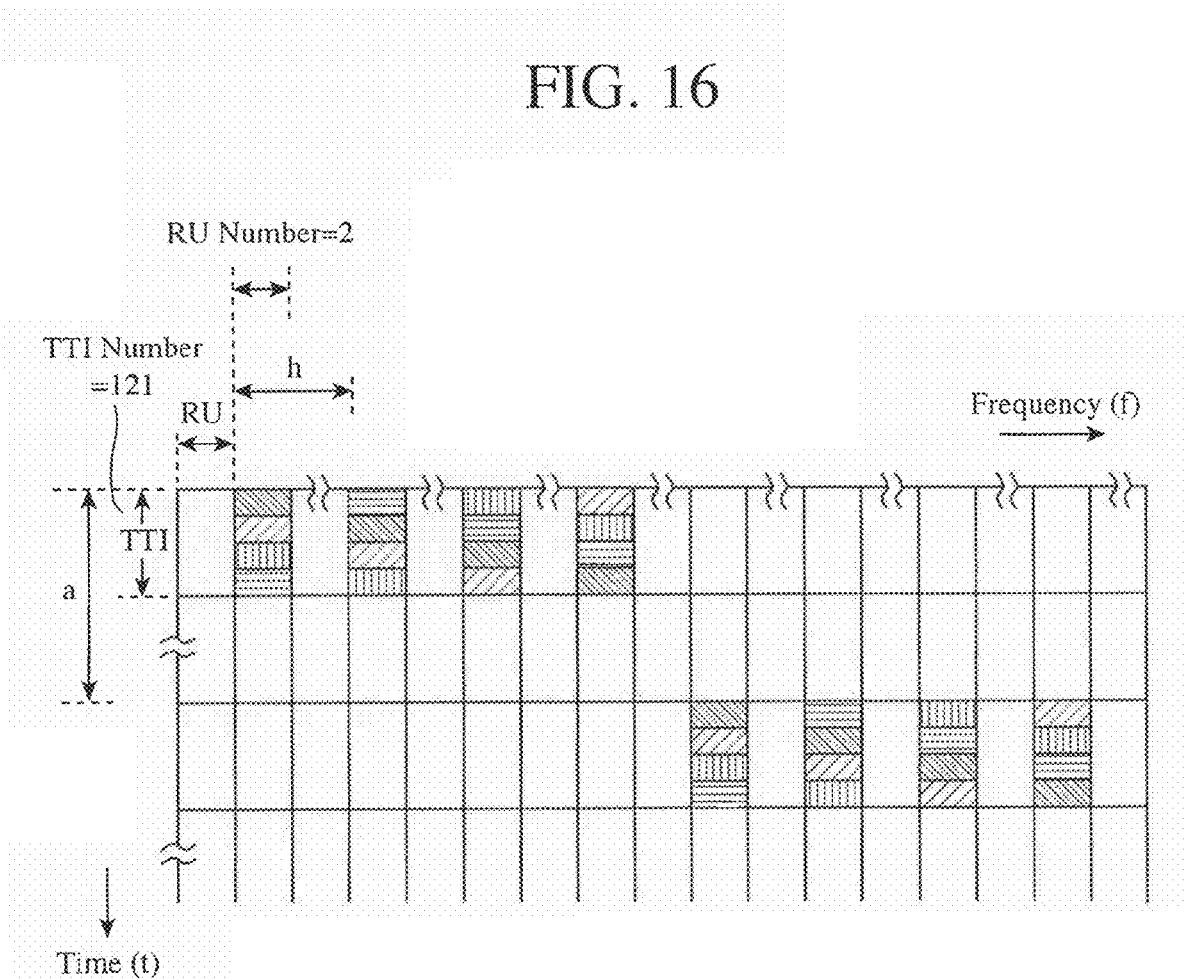
FIG. 16 is an explanatory drawing showing radio resource allocation for an uplink.

A second variant of Embodiment 3 will be explained hereafter. Allocation of radio resources at the time when the frequency hopping is performed during transmission of uplink data for which persistent scheduling is performed is shown in FIG. 16. FIG. 16 shows the allocation in a distributed fashion. In FIG. 16, the persistent intervals are designated by a, and uplink radio resources are allocated to a mobile terminal at fixed time intervals which are the persistent intervals a. The allocation at the persistent intervals is carried out in such a way that one resource unit is allocated in units of one TTI, as illustrated as an example. In this second variant, a method of carrying out frequency hopping on the time axis in units of a ½ subframe unit, and carrying out frequency hopping on the frequency axis a certain number of resource units is suggested as the frequency hopping method. FIG. 16 shows an example of hopping b resource units in units of a ½ subframe.

Setting parameters, as shown in FIG. 16, required in order to control the hopping include a resource unit b, a time offset, and a frequency offset, like those shown in FIG. 15, and further need a parameter indicating a hopping pattern for each terminal. As a concrete example, a parameter which can have a value "0" indicating a pattern of UE1, a value "1" indicating a pattern of UE2, a value "2" indicating a pattern of UE3, or a value "3" indicating a pattern of UE4 is generated. The hopping pattern intra TTI is not limited to the one shown in FIG. 16. The second variant can provide an advantage as will be explained below in addition to the advantage provided by the first variant. That is, by implementing the second variant, because all data within one TTI, i.e., all data in a resource which is allocated once at the persistent intervals are transmitted and received with a larger number of frequencies, compared with the first variant, communications further resistant to frequency phasing are implemented. Therefore, there is provided an advantage of being able to prevent occurrence of receiving errors (CRC errors) and to improve the throughput of the system.

A third variant of Embodiment 3 will be explained hereafter. In Embodiment 3 and the first and second variants, the method of hopping a certain number of resource units (RUs) on the frequency axis is suggested. In contrast with this, in accordance with the third variant, a method of hopping a certain number of subcarriers on the frequency axis is provided. The third variant needs a parameter indicating a certain number of subcarriers which are hopped on the frequency axis. Because the other parameters are the same as those shown in Embodiment 3 and the first and second variants, the explanation of the other parameters will be omitted hereafter. Because the above-mentioned control method, i.e., the method of making the mobile terminal and the base station share the setting parameters etc. is the same as that shown in Embodiment 3 and the first and second variants, the explanation of the method will be omitted hereafter. The third variant can provide an advantage as will be explained below in addition to the advantages provided by Embodiment 3, and the first and second variants. That is, by implementing the third variant, because all data within one TTI, i.e., all data in a resource which is allocated once at the persistent intervals are transmitted and received with a larger number of frequencies, compared with Embodiment 3 and the first and second variants, communications further resistant to frequency phasing are implemented. Therefore, there is provided an advantage of being able to prevent occurrence of receiving errors (CRC errors) and to improve the throughput of the system.

A fourth variant of Embodiment 3 will be explained hereafter. A method of frequency hopping (the regularity of the frequency hopping) is predefined in the fourth variant (static). The regularity of the frequency hopping shown in either of Embodiment 3, the first to third variants, and so on, which are previously explained, is included in the regularity of frequency hopping of this variant. Furthermore, the frequency hopping can be performed at the time of transmitting a Nack of HARQ (when the base station detects a receiving error (a CRC error) in uplink data from a mobile terminal and the mobile terminal receives a "Nack (a notification of the receiving error)" for the uplink data from the base station). The frequency hopping method shown in either of Embodiment 3 and the first to third variants, which are previously explained, is used as a concrete frequency hopping method of this variant. Furthermore, a number of patterns of the regularity of the frequency hopping can be determined, and a pattern number can be notified from the base station to the mobile terminal as a setting of the frequency hopping (semi-static).

Figure 14:
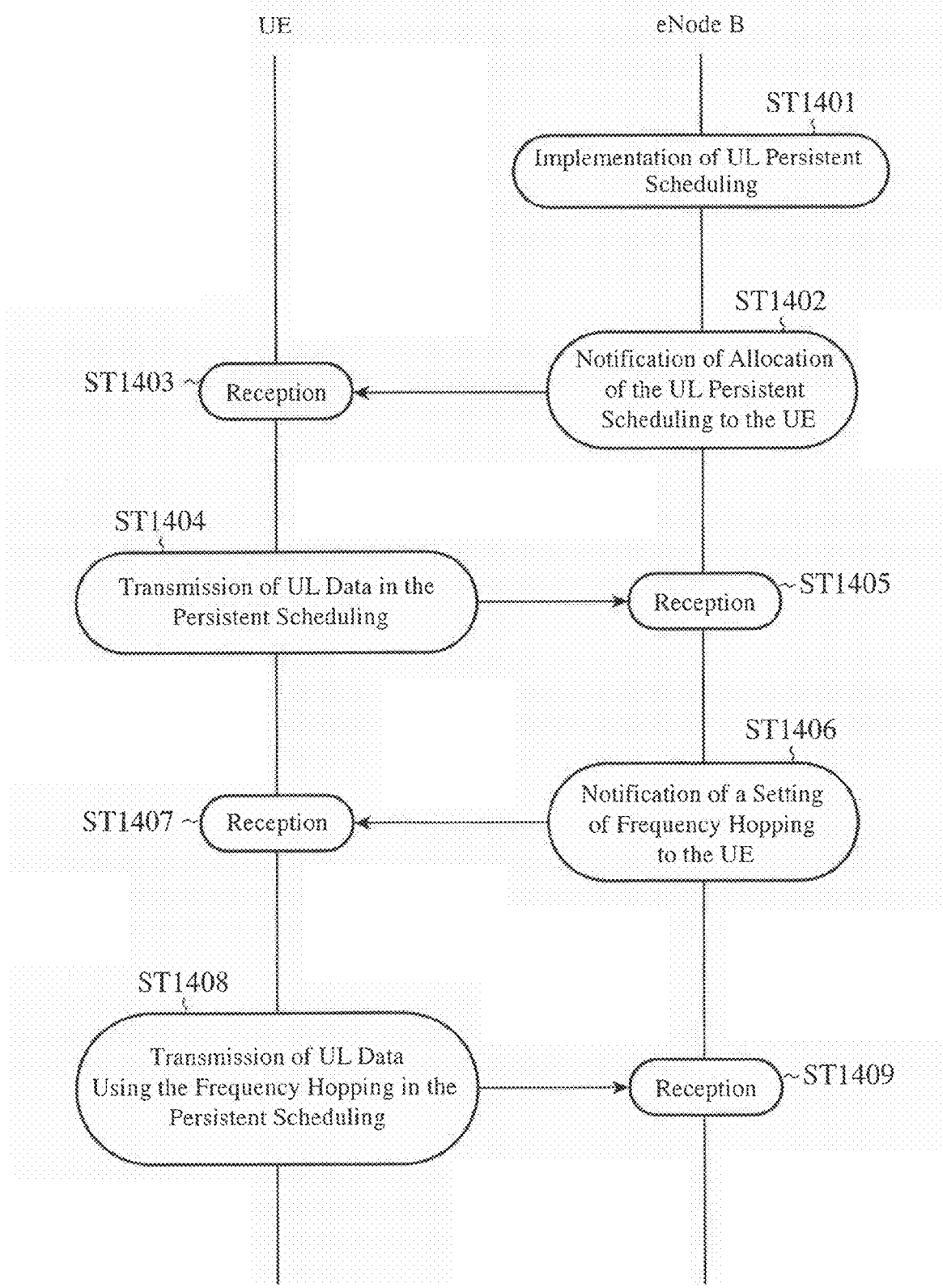
FIG. 14 is a flow chart for explaining a communication method in accordance with Embodiment 3 of the present invention.

This fourth variant of Embodiment 3 can provide further advantages as will be explained below. Because the control method of controlling the frequency hopping, i.e., the method of making the mobile terminal and the base station share the setting parameters etc. is the same as that shown in Embodiment 3 (FIG. 14). However, there is provided an advantage of being able to reduce the amount of control data (the amount of information) of the setting of the frequency hopping (the setting parameters and so on) which is, in ST1406 of FIG. 14, notified from the base station to the mobile terminal. Concretely, in the case of static, the necessity to make a notification of the setting can be eliminated, or only a notification of a start of the frequency hopping is made. In the case of semi-static, either only a notification of a pattern number for the setting of the frequency hopping or only a notification of a pattern number and a start of the frequency hopping is made. Reduction in the amount of control data is effective in terms of effective use of the radio resources. Furthermore, there can be provided another advantage of being able to reduce the time during which the mobile terminal receives control data, thereby implementing low power consumption in the mobile terminal.

In the method of carrying out the frequency hopping at the time of a Nack of HARQ, a communication path environment (a frequency band) in which a receiving error has occurred, i.e., a bad communication path environment can be avoided, and retransmission with HARQ can be carried out by using another frequency. Therefore, there can be provided an advantage of being able to reduce the number of retransmissions compared with a case in which retransmission is carried out via a communication path environment (a frequency band) in which an receiving error has occurred. Therefore, a communication method resistant to frequency phasing can be provided. Thereby, there is provided another advantage of improving the throughput of the whole system.

Figure 17:
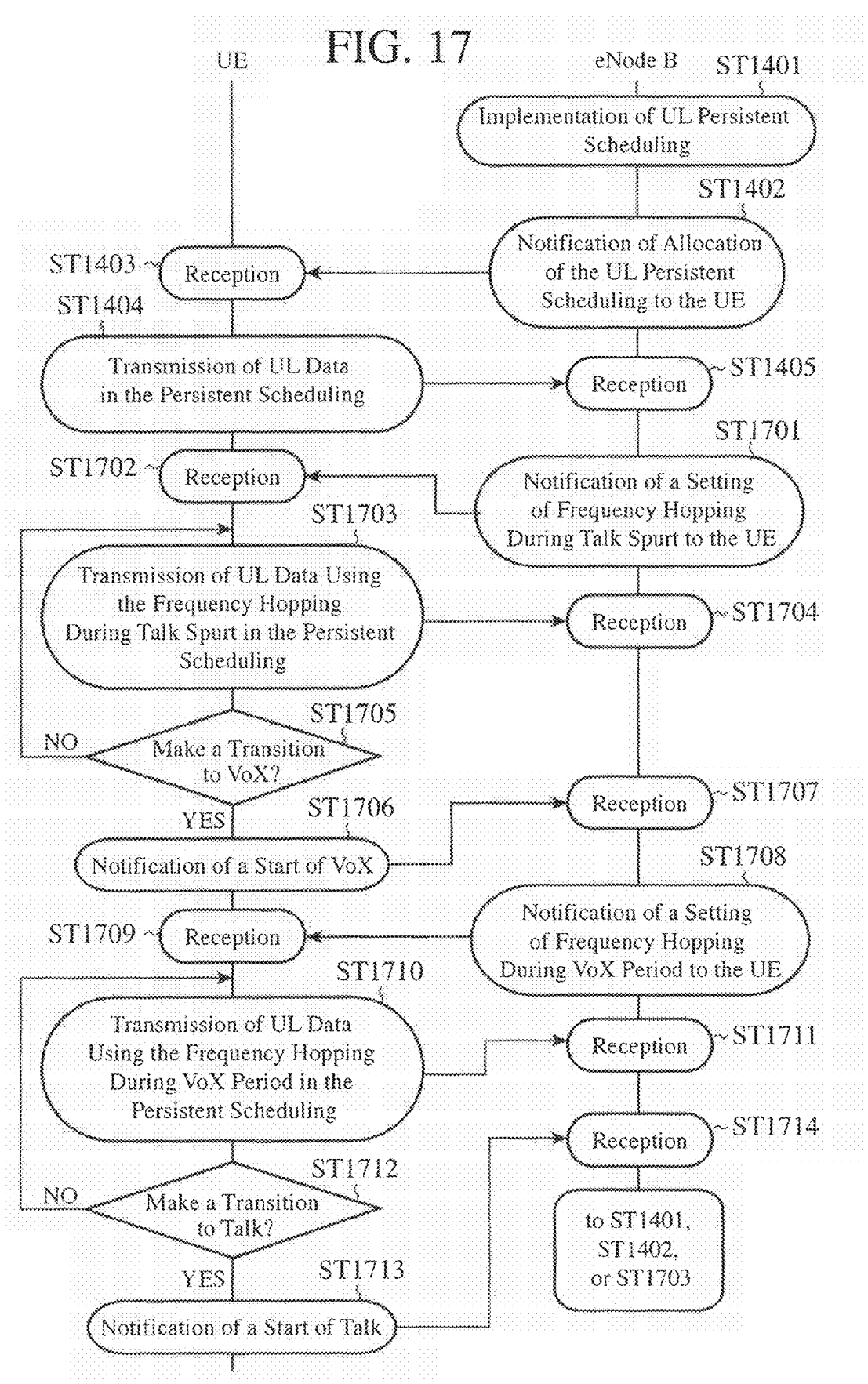
FIG. 17 is a flow chart for explaining the communication method in accordance with Embodiment 3 of the present invention.

A fifth variant of Embodiment 3 will be explained hereafter. In accordance with the fifth variant, the method of carrying out the frequency hopping explained in either of Embodiment 3 and the first to fourth variants is changed between a talk spurt and a silent state in persistent scheduling. The control method, i.e., the method of making the mobile terminal and the base station share the setting parameters etc. will be explained with reference to FIG. 17. In FIG. 17, the same reference numerals as those shown in FIG. 14 denote the same components or like components, and therefore the explanation of these components will be omitted hereafter. In FIG. 17, the base station notifies a setting of the frequency hopping of a talk spurt (setting parameters etc.) to the mobile terminal (ST1701). The base station can use an L1/L2 control signal to make this notification. The mobile terminal receives the setting of the frequency hopping of a talk spurt (the setting parameters etc.) (ST1702). The sequence of the process of ST1402 in which the base station notifies allocation of uplink persistent scheduling to the mobile terminal, and that of ST1701 is arbitrary. The mobile terminal transmits uplink data according to both the setting of the frequency hopping of a talk spurt which the mobile terminal has received, and the allocation of uplink persistent scheduling which the mobile terminal has accepted in ST1403 (ST1703). The base station receives the uplink data from the mobile terminal (ST1704).

The mobile terminal judges whether to make a transition from the talk state to a silent state (ST1705). When "No" in the judgment of ST1705, the mobile terminal returns to ST1703 in which the mobile terminal continues transmission of uplink data. In contrast, when "Yes" in the judgment of ST1705, the mobile terminal carries out ST1706. The mobile terminal notifies a "VoX start" with which the mobile terminal notifies the base station that the mobile terminal makes a transition from the talk state to a silent state (ST1706). The base station receives the notification of a "VoX start" from the mobile terminal (ST1707). As the mobile terminal makes a transition from the talk state to a silent state, the base station notifies a setting of the frequency hopping of a silent state (setting parameters etc.) to the mobile terminal so as to change the setting of the frequency hopping (ST1708). The base station can use an L1/L2 control signal to make this notification. The mobile terminal receives the setting of the frequency hopping of a silent state (the setting parameters etc.) (ST1709) The mobile terminal transmits uplink data according to both the setting of the frequency hopping of a silent state which the mobile terminal has received, and the allocation of uplink persistent scheduling which the mobile terminal has accepted in ST1403 (ST1710). The base station receives the uplink data from the mobile terminal (ST1711). The mobile terminal judges whether the uplink data make a transition to a talk spurt (ST1712). When "No" in the judgment of ST1712, the mobile terminal returns to ST1710. In contrast, when "Yes" in the judgment of ST1712, the mobile terminal notifies a "talk start" to the base station (ST1713). When receiving the notification of a "talk start" from the mobile terminal (ST1714), the base station carries out ST1401, ST1402, or ST1701.

The previously-explained fifth variant can provide further advantages as will be explained below. When persistent-scheduling voice packet data (VoIP) which are coded with AMR, the length of the persistent intervals is 20 milliseconds in a talk spurt and is 160 milliseconds in a silent state. Thus, there can be a case in which the length of the persistent intervals varies between in a talk spurt and in a silent state. In this case, the fifth variant is effective in that it can set up an optimal frequency hopping method according to the length of the persistent intervals. Therefore, there is provided an advantage of being able to implement communications further resistant to frequency phasing, to prevent occurrence of receiving errors (CRC errors), and to improve the throughput of the system.

Furthermore, in this Embodiment 3, distributed allocation is shown as an example. This Embodiment 3 can also be applied to localized allocation. Furthermore, the frequency hopping can also be used for downlink data transmission for which persistent scheduling is carried out. In this case, the hopping method, the control method, and the method of making the mobile terminal and the base station share the control method, which are shown in either of Embodiment 3 and the first to fifth variants, can be used. Furthermore, the frequency hopping can also be used for transmission of uplink data and transmission of downlink data for which not persistent scheduling but dynamic scheduling is carried out. In this case, the hopping method, the control method, and the method of making the mobile terminal and the base station share the control method, which are shown in one or more of Embodiment 3 and the first to fifth variants, can be used.

Embodiment 4

In Embodiments 1 to 3, when making a transition from a talk state to a silent state, a base station transmits information about resources which are to be allocated to silent data during a silent state to a mobile terminal by using an L1/L2 control signal. In this embodiment, there is disclosed a method of a base station transmitting information about resources which are allocated during a silent state to a mobile terminal by using an L3 message in advance, and, when making a transition from a talk state to a silent state, the eNB transmitting only either a signal indicating a transition to a silent state or a signal indicating approval for making a transition to a silent state to the UE by using an L1/L2 control signal. The amount of data required during a silent period, such as background noise data, is equal to or smaller than the amount of data required during a talk spurt, and the amount of data of the background noise does not change. Therefore, the transmission of the information about resources which are allocated during a silent state from the base station to the mobile terminal which is carried out every time when making a transition from a talk state to a silent state is a waste of the resources. In Embodiments 1 to 3, the information about resources which are allocated during a silent state is transmitted from the base station to the mobile terminal by using an L1/L2 control signal every time when making a transition from a talk state to a silent state. In contrast, in accordance with this embodiment, the transmission of the information about resources which are allocated during a silent state when making a transition from a talk state to a silent state is abolished in order to reduce the useless use of resources which are allocated to the transmission of a control signal. Furthermore, a mobile terminal can reduce its power consumption by stopping the operation clock thereof during a TTI during which the mobile terminal does not transmit and receive any voice data to enter a sleep mode. In contrast, this embodiment is aimed at reducing the amount of control information which a mobile terminal receives from a base station in the course of communications with the base station to reduce the transmission and reception operating times of the mobile terminal and to reduce the power consumption of the mobile terminal.

Figure 18:
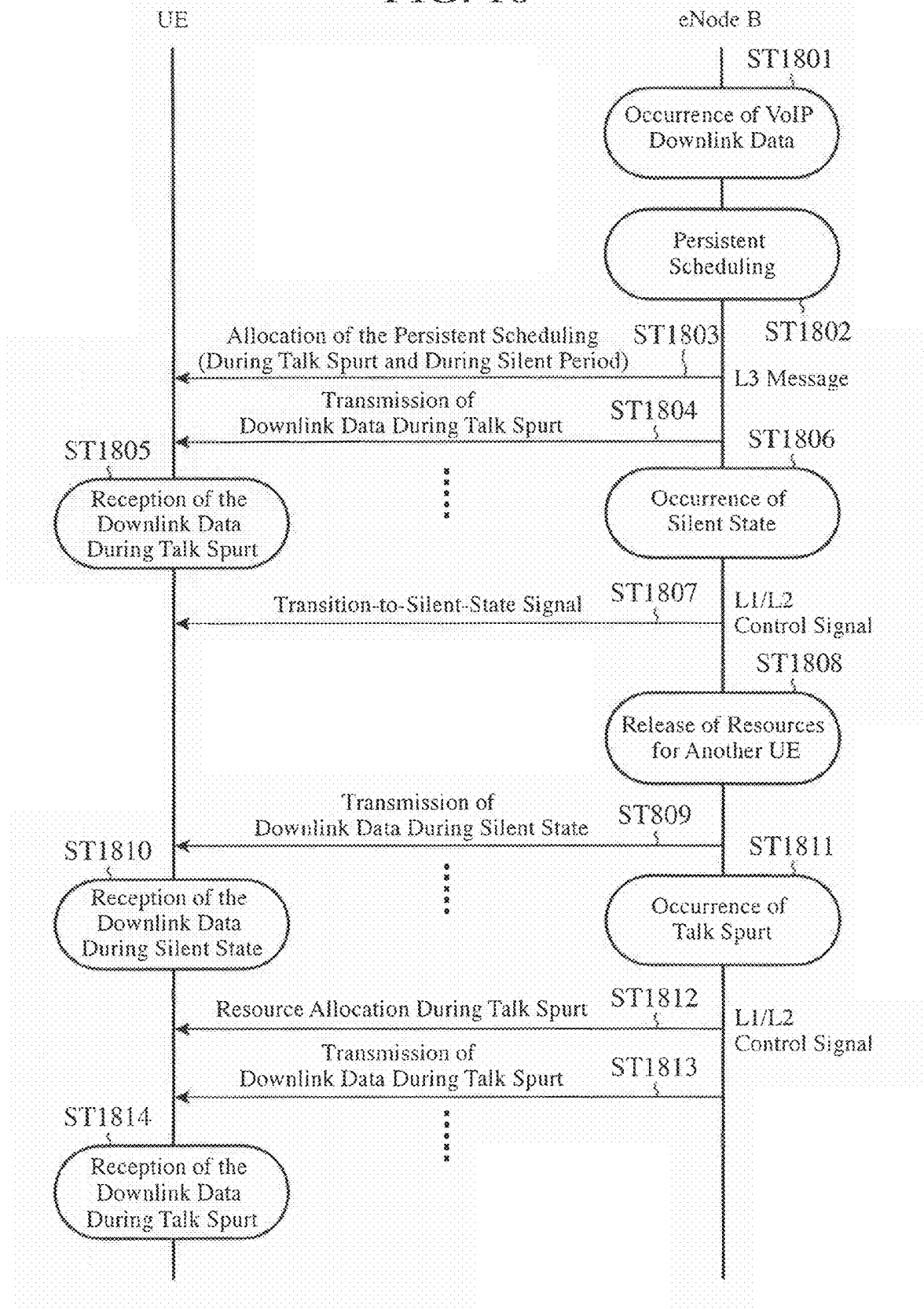
FIG. 18 is a flow chart showing processes of a communication method in accordance with Embodiment 4 of the present invention.

A series of operations of a mobile terminal and a base station which use the method disclosed in this embodiment in a case in which VoIP downlink data occur is shown in FIG. 18. In FIG. 18, compared with FIG. 8 in Embodiment 1, when a silent state occurs, the base station does not transmit "information about a channel exclusive for silent period" to the mobile terminal by using an L1/L2 control signal. Furthermore, compared with Embodiment 2, the base station does not transmit "information about resource allocation during a silent state" by using an L1/L2 control signal. In FIG. 18, when downlink voice packet data (VoIP) occur in the base station (ST1801), the scheduler of the base station performs persistent scheduling (ST1802). After that, the base station transmits resource allocation information and MCS setting information for persistent scheduling to the mobile terminal and further transmits information about a channel exclusive for silent period or information about resource allocation during a silent state to the mobile terminal by using an L3 control signal (an L3 message) (ST1803). After that, the base station transmits VoIP data in a talk section (ST1804). Because the mobile terminal, in ST1803, has received the resource allocation information and the MCS setting information using an L3 control signal, the mobile terminal recognizes the resource allocation of the VoIP data in the talk section and can therefore receive the VoIP data (ST1805).

When a silent state occurs (ST1806), the base station transmits information indicating a transition from the talk state to the silent state (a silent state transition signal) as an L1/L2 control signal (ST1807). In this step, the base station notifies, as an L1/L2 control signal, neither information about a channel exclusive for silent period nor information about resource allocation during a silent state to the mobile station. This is because either information about a channel exclusive for silent period or information about resource allocation during a silent state is already transmitted, as an L3 control signal, from the base station to the mobile terminal at the time of a start of persistent scheduling. The mobile terminal which has received the silent state transition signal from the base station receives downlink data (background noise) during the silent state on the basis either the information about the channel exclusive for silent period or the information about resource allocation during a silent state which the mobile terminal, in ST1803, received as an L3 control signal (ST1809 and ST1810). After the base station allocates the downlink data to be transmitted during the silent state to the channel exclusive for silent period on the basis of the L3 control signal, the base station releases resources which are not used among the resources which have been allocated during the talk spurt, and then allocates them to another mobile terminal (ST1808).

When making a transition from the silent state to a talk state and voice packet data occur again (ST1811), the base station notifies information about resource allocation during a talk spurt to the mobile terminal by using an L1/L2 control signal (ST1812), and then transmits voice packet data according to the information (ST1813). The information about resource allocation can be the same as or differ from that about resource allocation during the talk spurt before the silent state has occurred. In short, the base station can determine the information about resource allocation according to the scheduling status and the channel quality status at that time. The mobile terminal which has received the resource allocation information by using an L1/L2 control signal recognizes the resource allocation of the voice packet data during the talk spurt, and receives the voice packet data (ST1814).

As previously explained, when downlink voice packet data (VoIP) occur, the base station performs persistent scheduling, and transmits, as an L3 control signal, the resource allocation information and the MCS setting information for persistent scheduling, and the information about a channel exclusive for silent period or the information about resource allocation during a silent state to the mobile terminal (ST1803 of FIG. 18). The method according to either of Embodiments 1 to 3 is applied to the information about a channel exclusive for silent period and the information about resource allocation during a silent state and the information about resource allocation during a silent state which are transmitted to the mobile terminal as an L3 control signal. In a case in which a channel exclusive for silent period as explained in Embodiment 1 is disposed, the values of parameters for using the channel exclusive for silent period are predetermined. For example, the value of a parameter indicating the structure of the channel exclusive for silent period, and the value of a parameter indicating which part of the channel exclusive for silent period is used are predetermined. The types described in Embodiment 1 can be applied as the types of parameters. Also in the case of using time division multiplexing or code division multiplexing, instead of frequency division multiplexing, the present invention can be implemented as long as the values of the parameters for using the channel exclusive for silent period are determined in advance.

However, in a case in which a part of the resources allocated during a talk spurt is allocated as resources during a silent state with the method explained in Embodiment 2, the value of a parameter showing a part of the resources which are used for data to be transmitted during a silent state is not determined in advance. For example, it is assumed that an RB (Resource Block) number or the like which is used for data to be transmitted during a silent state is predetermined, and it is shared by a eNB and a UE or is notified from the eNB to the UE by using an L3 control signal at the time of an initial setting of persistent scheduling. However, there is a possibility that resource allocation during a talk spurt varies between at the time of a first-time talk spurt and at the time of a subsequent talk spurt. When resource allocation during a talk spurt varies between at the time of a first-time talk spurt and at the time of a second-time talk spurt, the RB number used for data to be transmitted during a silent state differs between at the time of a first-time transition to a silent state and at the time of a second-time transition or a later transition to a silent state. This is because the resources allocated as the resources during a silent state are a part of the resources allocated during a talk spurt. In such a case, there arises a problem that the resources collide with those allocated to another mobile terminal.

In a case in which a part of the resources allocated during a talk spurt is allocated as the resources during a silent state, it is preferable to determine a method of selecting this part of the resources to make the base station and the mobile terminal share the method in advance. Because during a talk spurt, resources are allocated for every mobile terminal from the first, the collision with another mobile terminal can be avoided by using the part of the resources also during a silent state. Therefore, by enabling even the mobile terminal and the base station to acquire the method of selecting the part of the resources, the mobile terminal is enabled to judge which resource the mobile terminal should receive and therefore receive data transmitted during a silent state. Concretely, there is a method of selecting only a number of RBs required during a silent period from the lowest frequency allocated during a talk spurt.

Figure 19:
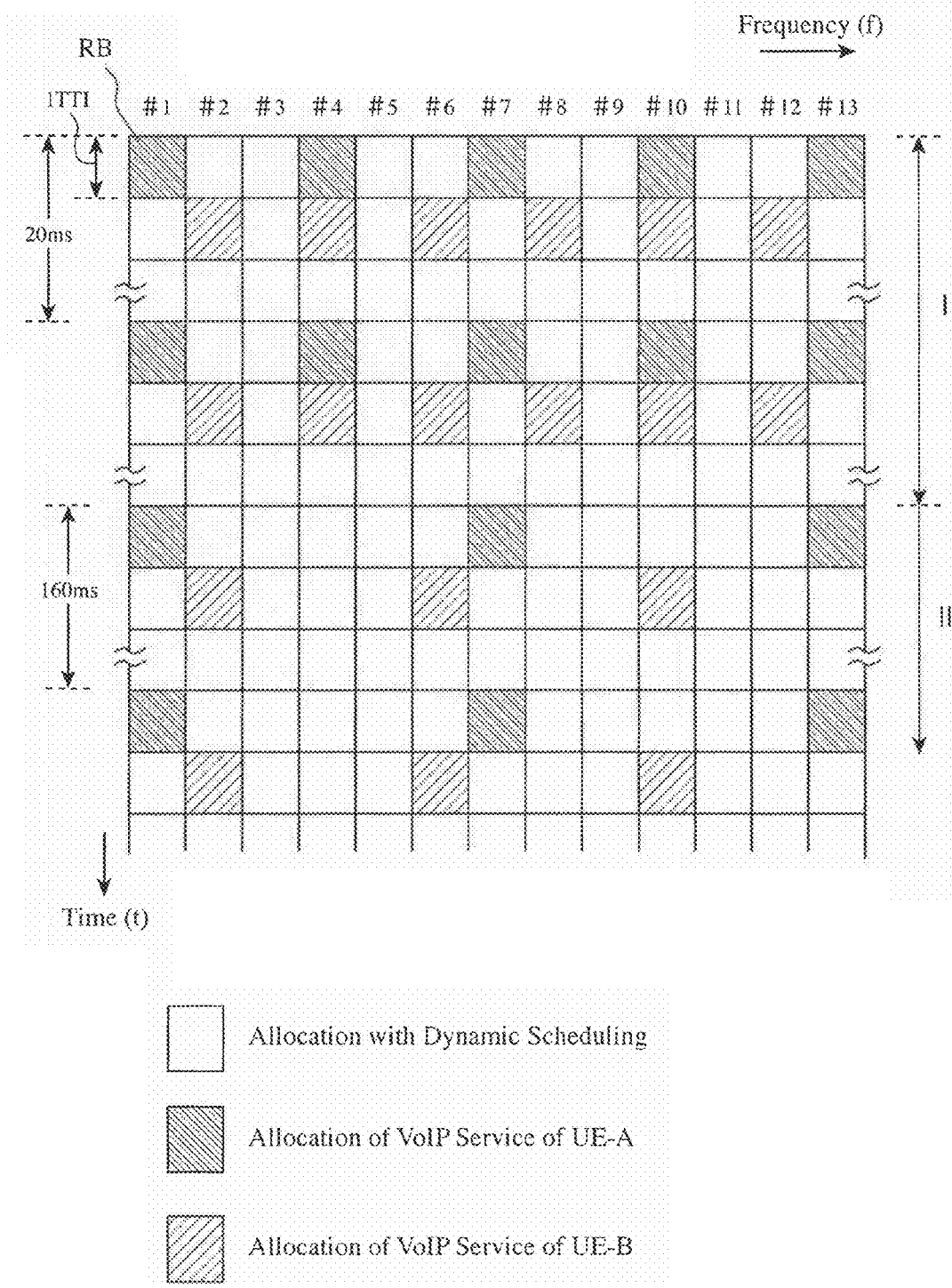
FIG. 19 is an explanatory drawing showing resource allocation for a downlink.

Another method will be explained hereafter. FIG. 19 is an explanatory drawing showing resource allocation for a downlink. As shown in FIG. 19, resource blocks (RBs) are numbered. A resource block on the lowest frequency side is numbered #1, and subsequent resource blocks are numbered #2, #3, and . . . . A minimum of the number of an RB allocated during a talk spurt immediately before making a transition to a silent state is expressed as Ts, the interval between adjacent RBs is expressed as Td, and the number of RBs is expressed as Tn. In the case of this figure, Ts=1, Td=3, and Tn=5 for a UE-A, and Ts=2, Td=2, and Tn=6 for a UE-B. Furthermore, it is assumed that the number of RBs required during a silent period is k. The numbers Xn of RBs which are allocated during a silent state are determined as follows:

$$Xn=Xs+n \times Td \times Int((Tn-k)/(k-1)+1)$$

Xs=Ts, n=0, 1, . . . , k−1

When the number of RBs required during a silent period is 3, the following numbers: Xn=1, 7, and 13 are determined for the UE-A. That is, data to be transmitted during a silent state are allocated to the RBs #1, #7, and #13. For the UE-B, the following numbers: Xn=2, 6, and 10 are determined. That is, data to be transmitted during a silent state are allocated to the RBs #2, #6, and #10. By doing in this way, because the RBs which are allocated during a silent state are selected from across a wide band, there is provided an advantage of being able to provide a gain of frequency diversity. Although there can be considered various methods of providing regularity, in addition to this example, what is necessary is just to provide whether the part of the resources which have been allocated during a talk spurt will be allocated to a silent period, and to provide regularity to the method of determining the part of the resources.

As the method of providing regularity to the above-mentioned method of selecting the part, the example in which a part of resources on the frequency axis is allocated to the resources during a silent state in units of RBs is disclosed. This method can also be applied to a case in which the resources are allocated in units of one or more subcarrier units or in units of VRBs. Furthermore, in a case in which a part of resources on the time axis is allocated to the resources during a silent state, each RB is divided into a plurality of regions (for example, in units of a subframe, a ½ subframe, or a symbol), these plurality of regions are numbered, and region numbers are allocated to a plurality of mobile terminal, respectively, like in the case in which a channel exclusive for silent period is used.

In the case in which a part of the resources allocated during a talk spurt is allocated as the resources during a silent state, what is necessary is just to predetermine a rule for selecting this part as information about a resource allocation region during a silent state. When persistent scheduling is performed, the information about resource allocation during a talk spurt is notified from the base station to the mobile terminal by using an L3 control signal or an L1/L2 control signal. Therefore, when making a transition from a talk state to a silent state, the base station derives a resource region during a silent state from the information about resource allocation during a talk spurt according to the predetermined rule, and allocates data to be transmitted during a silent state to the resource which the base station has derived. The mobile terminal can derive the resource region allocated during a silent state from the information about resource allocation during a talk spurt according to the same rule, and receives this resource region. For example, a parameter (e.g., the number k of RBs required during a silent period) which does not vary during a talk spurt among the parameters required for the predetermined rule is also predetermined, and this parameter can be shared between the eNB and the UE, or, when persistent scheduling is performed, can be transmitted first by using an L3 message which is transmitted from the base station to the mobile terminal.

As disclosed in this embodiment, when the base station transmits information about resources which the base station will allocate during a silent state to the mobile terminal by using an L3 message and then makes a transition from a talk state to a silent state, the base station transmits only an L1/L2 control signal indicating that the base station makes a transition to a silent state or approves a transition to a silent state to the mobile terminal. That is, an L1/L2 control signal is not a large required amount of information about the resources which will be allocated during a silent state, but is information which requires only a small amount of data and which shows a transition to a silent state. Therefore, it is possible to reduce the amount of data required for an L1/L2 control signal to be communicated once. Furthermore, because the system does not enter a state in which any resources cannot be allocated when making a transition from a talk state to a silent state, there can be provided an advantage of being able to prevent data from being delayed and lost. In addition, there can be provided the same advantages as those mentioned in Embodiments 1 to 3, such as an advantage of being able to reduce the useless resource allocation and release resources associated with this useless resource allocation in such a way that they are allocated to another mobile terminal. Furthermore, because it is not necessary to transmit the information about resource allocation during a silent state every time when making a transition from a talk state to a silent state, there is provided another advantage of being able to reduce the useless use of the resources, and reduce the scheduling load on the base station. Therefore, an improvement can be provided in the throughput of the system. Furthermore, a mobile terminal can reduce its power consumption by stopping the operation clock thereof during a TTI during which the mobile terminal does not transmit and receive any voice data to enter a sleep mode. In contrast, in accordance with this embodiment, because the amount of control information which a mobile terminal receives from a base station in the course of communications is reduced, the transmission and reception operating times of the mobile terminal can be reduced, and therefore the power consumption of the mobile terminal can be further reduced.

In this embodiment, the case in which resources are allocated in a distributed fashion is shown. As an alternative, the resource allocation can be carried out in a localized fashion, and the present invention can also be applied to this case. Resource allocation accompanied by frequency hopping can be alternatively carried out, and the present invention can also be applied to this case. In this embodiment, the case of downlink transmission is shown. The present invention can also be applied to uplink transmission. For example, in a series of operations performed by a base station and a mobile terminal in the case in which the present invention is applied to uplink transmission, as shown in FIG. 14 explained in Embodiment 3, when making a transition from a talk state to a silent state, what is necessary is just to eliminate a notification of the resource allocation information about frequency hopping (the control method of controlling frequency hopping: ST1406 in FIG. 14) from the base station to the mobile terminal by using an L1/L2 control signal, and transmit only a signal indicating that the base station makes a transition to a silent state or approves a transition to a silent state to the UE. In a case in which frequency hopping is carried out while persistent scheduling is performed, what is necessary is just to transmit the resource allocation information about frequency hopping by using a first L1/L2 control signal, without having to transmit this information by using any subsequent L1/L2 control signal, and to transmit only a signal indicating that the base station makes a transition to a silent state or a signal indicating that the base station approves a transition to a silent state from the base station to the mobile terminal.

Embodiment 5

In this embodiment, a method of reducing the time required for a mobile terminal to transmit uplink data in a case in which persistent scheduling is being performed for a downlink and the mobile terminal transmits a scheduling request signal (SR) via an uplink is disclosed. FIG. 20 is an explanatory drawing showing a method of receiving a downlink L1/L2 control signal which a mobile terminal uses. FIG. 21 is a flow chart showing processes of a communication method in accordance with Embodiment 5 of the present invention. In FIG. 20, the receiving method of receiving a downlink L1/L2 control signal, which the mobile terminal uses, is explained as to the case in which persistent scheduling for a downlink is being performed and the mobile terminal transmits a scheduling request SR via an uplink. (1) of FIG. 20 shows a conventional receiving method in a case in which downlink persistent scheduling is being performed, and (2) shows the receiving method according to the present invention in a case in which downlink persistent scheduling is being performed.

In the conventional receiving method of (1), the mobile terminal receives a downlink L1/L2 control signal at fixed time intervals according to downlink persistent scheduling. For example, during a talk spurt the mobile terminal receives talk spurt data, such as an L1/L2 control signal or voice packet data, at time intervals of 20 milliseconds, whereas during a silent state the mobile terminal receives silent data, such as background noise data, at time intervals of 160 milliseconds and also receives an L1/L2 control signal at time intervals of 20 milliseconds. When uplink data occur in the mobile terminal, the mobile terminal transmits a scheduling request to the base station. The base station which has received the scheduling request transmits an L1/L2 control signal, such as resource allocation information, to the mobile terminal. In this case, the timing which the base station transmits it must be fixed time intervals (e.g., time intervals of 20 msec) at which the persistent scheduling is carried out. This is because the mobile terminal carries out reception only at fixed time intervals which are determined through the persistent scheduling.

Therefore, a delay occurs until the base station transmits an L1/L2 control signal, such as resource allocation, after the base station receives the scheduling request. Furthermore, when the mobile terminal cannot receive an L1/L2 control signal which is a response to the scheduling request, the mobile terminal transmits the scheduling request again. The base station also transmits an L1/L2 control signal, such as resource allocation which is a response to this retransmission scheduling request, at the timing at which the persistent scheduling is carried out, and hence a further delay occurs. A problem is therefore that in the mobile terminal, uplink data which the mobile terminal cannot transmit even if the mobile terminal desires to transmit them are accumulated, and, when the scheduling request has ended in failure for a long time, data overflow from the transmission buffer of the mobile terminal. A further problem is that when voice packet data are transmitted, for example, a voice is heard behind time.

The receiving method as shown in (2) of FIG. 20 is effective in solving these problems. When uplink data occur in the mobile terminal, the mobile terminal transmits a scheduling request signal to the base station. The base station which has received the scheduling request transmits an L1/L2 control signal, such as resource allocation information, to the mobile terminal. In this case, it is assumed that after receiving the scheduling request, the base station transmits the L1/L2 control signal at the earliest possible timing, instead of transmitting the L1/L2 control signal at the timing at which the persistent scheduling is carried out. It is preferable that the timing at which the base station transmits an L1/L2 control signal, such as resource allocation information, in response to a scheduling request from the mobile station is, for example, time intervals of one TTI. On the other hand, the mobile terminal does not carry out reception of an L1/L2 control signal at the timing determined by the persistent scheduling, but performs continuous reception of an L1/L2 control signal at the timing which is time intervals of one TTI immediately after transmitting the scheduling request. The execution of this method makes it possible to reduce the delay which occurs until the base station transmits an L1/L2 control signal, such as resource allocation, after the base station receives the scheduling request to a minimum. Also when the mobile terminal retransmits the scheduling request because the mobile terminal cannot receive the L1/L2 control signal which is a response to the scheduling request, the mobile terminal makes it possible to reduce the time delay by performing continuous reception of an L1/L2 control signal at the timing which is time intervals of one TTI unit immediately after transmitting a retransmission scheduling request. The mobile terminal which has received the resource allocation signal from the base station returns again to reception only at fixed time intervals which are determined through the downlink persistent scheduling.

Referring to FIG. 21, a series of operations of the mobile terminal and the base station including up to the mobile terminal's operation of transmitting uplink data after transmitting the scheduling request via an uplink while persistent scheduling is performed in downlink voice (VoIP) communications will be explained. First, as shown in ST2101, persistent scheduling is carried out for a downlink, and the base station transmits an L1/L2 control signal at time intervals of 20 milliseconds during a silent state (VOX) and the mobile terminal receives the L1/L2 control signal at time intervals of 20 milliseconds. When uplink data occur in the mobile terminal, the mobile terminal transmits a scheduling request to the base station (ST2102). Immediately after transmitting the scheduling request, the mobile terminal performs a continuous reception operation of continuously receiving an L1/L2 control signal (ST2103). On the other hand, the base station which has received the uplink scheduling request from the mobile terminal immediately transmits resource allocation information and so on, as an L1/L2 control signal, to the mobile terminal without waiting for the transmission timing which is predetermined time intervals according to the downlink persistent scheduling (ST2104). When the mobile terminal has received an L1/L2 control signal, such as resource allocation information including, for example, a "grant signal" (if Yes in ST2105), the mobile terminal carries out reception at the receiving timing of an L1/L2 control signal which is determined by the general downlink persistent scheduling (ST2106).

When the mobile terminal cannot receive the L1/L2 control signal, such as resource allocation information, which is transmitted thereto from the base station (if No in ST2105), the mobile terminal carries out continuous reception of an L1/L2 control signal while retransmitting the scheduling request to the base station. Also when receiving the scheduling request retransmitted thereto, the base station transmits resource allocation information and so on by using an L1/L2 control signal promptly without waiting for the transmission timing according to the downlink persistent scheduling. Because the mobile terminal performs continuous reception of an L1/L2 control signal after transmitting the scheduling request, the mobile terminal can receive L1/L2 control information transmitted from the eNB. This series of operations is repeated until the mobile terminal receives an L1/L2 control signal, such as resource allocation information. When the mobile terminal receives an L1/L2 control signal, such as resource allocation information, from the base station, the mobile terminal returns again to reception at fixed time intervals (20 msec) which are determined through the downlink persistent scheduling. The mobile terminal further transmits uplink data on the basis of this received resource allocation information and according to grant which is scheduled by the base station (ST2107).

As disclosed in this embodiment, in the case in which downlink persistent scheduling is carried out and the mobile terminal transmits a scheduling request via an uplink, both the base station and the mobile terminal transmit and receive an L1/L2 control signal, such as resource allocation information, without waiting for the timing determined by the downlink persistent scheduling. Therefore, while the advantages of the persistent scheduling are maintained, the delay which occurs until the base station transmits an L1/L2 control signal, such as resource allocation, after the base station receives the scheduling request can be reduced to a minimum. The mobile terminal can reduce the delay which occurs until the mobile terminal receives an L1/L2 control signal, such as resource allocation, which the base station has transmitted to a minimum. That is, the time delay which occurs until the mobile terminal transmits uplink data after transmitting the scheduling request can be reduced to a minimum. The present invention is suitable especially for communications of voice packet data (VoIP) which require a real-time nature, because the problem that, for example, a voice is heard behind time can be solved.

INDUSTRIAL APPLICABILITY

As mentioned above, the communication method, the base station, the communication system, and the mobile terminal in accordance with the present invention can reduce the useless allocation of resources and improve the throughput by, during a silent state, allocating resources to a channel exclusive for silent period while releasing the resources which have been allocated to the mobile terminal during a talk spurt. Therefore, the communication method, the base station, the communication system, and the mobile terminal in accordance with the present invention are suitable for use with a base station and a mobile terminal which construct a communication system based on an LTE method, a communication control method of controlling communications between a base station and a mobile terminal at the time of the communications, a communication method of communicating a control signal, and so on.

The invention claimed is:

1. A data communication method executed by a communication system including a base station and a mobile terminal, the base station performing a persistent scheduling process of transmitting a scheduling result in a predetermined notification cycle, and transmitting and receiving packet data by using an Orthogonal Frequency Division Multiplexing method as a downlink access method, and the mobile terminal transmitting a scheduling request signal to make a request of said base station for allocation of radio resources, and transmitting and receiving said packet data by using radio resources allocated thereto by said base station, said data communication method comprising:

a talk state judging process of, when there exists voice information to be transmitted to said mobile terminal from the base station, the base station judging whether the communication system is in either a talk state in which said base station transmits said voice information as voice packet data to the mobile terminal, or a silent state in which said base station transmits background noise data as said voice packet data to the mobile terminal;

a notification process of the base station transmitting a resource allocation message to the mobile terminal at a time of entering the talk state, the resource allocation message including information of both talk-spurt radio resources available to a talk spurt in the talk state and silent-period radio resources available in the silent state; and a radio resource allocating process of the base station releasing the talk-spurt radio resources allocated to said mobile terminal in the talk state when the base station detects a transition from the talk state to the silent state through the talk state judging process, and the base station allocating said released talk-spurt radio resources to another mobile terminal.

2. The communication method according to claim 1, wherein the silent-period radio resources include a parameter indicating a frequency region and a time region of a channel exclusive for the silent state which is disposed for transmission of the voice packet data including background noise data.

3. The communication method according to claim 1, wherein the silent-period radio resources include a parameter indicating a frequency region and a time region which specify a resource block, among the talk-spurt radio resources, to which the voice packet data including background noise data is allocated.

4. The communication method according to claim 1, wherein, when a second voice packet data is transmitted from the mobile terminal to the base station, a radio resource allocated for transmission of said second voice packet data is determined by using frequency hopping.

5. The communication method according to claim 1, wherein the persistent scheduling process includes performing scheduling according to the scheduling request signal transmitted from the mobile terminal, and notifying a scheduling result at an arbitrary timing independent of the notification cycle of the persistent scheduling process.

6. The communication method according to claim 5, wherein the communication method further includes:

the mobile terminal transmitting the scheduling request signal to the base station, and the mobile terminal receiving the scheduling result at an arbitrary timing independent of the notification cycle of the persistent scheduling process performed by the base station.

7. The communication method according to claim 1, wherein the resource allocation message is an L3 control signal which is a control signal notified from an upper layer so as to provide notification of the talk-spurt radio resources and the silent-period radio resources.

8. A base station which performs a persistent scheduling process of transmitting a scheduling result in a predetermined notification cycle, and transmits and receives packet data by using an Orthogonal Frequency Division Multiplexing method as a downlink access method, said base station comprising:

a notification processing circuit configured to transmit a resource allocation message to a mobile terminal at a time of entering a talk state, the resource allocation message including information of both talk-spurt radio resources available to a talk-spurt in the talk state and silent-period radio resources available in a silent state, the talk state in which the base station transmits voice information as voice packet data to the mobile terminal, and the silent state in which the base station transmits background noise data as the voice packet data to the mobile terminal; and a control processing circuit configured to judge whether the base station is in either said talk state or said silent state, release talk-spurt radio resources allocated to said mobile terminal in the talk state when the base station detects a transition from the talk state to the silent state through said judgment, and allocate said released talk-spurt radio resources to another mobile terminal.

9. A communication system including a base station and a mobile terminal, the base station performs a persistent scheduling process of transmitting a scheduling result in a predetermined notification cycle, and transmits and receives packet data by using an Orthogonal Frequency Division Multiplexing method as a downlink access method, and the mobile terminal transmits a scheduling request signal to make a request of said base station for allocation of radio resources, and transmits and receives said packet data by using radio resources allocated thereto by said base station, said communication system comprising:

the base station including a notification processing circuit configured to transmit a resource allocation message to the mobile terminal at a time of entering a talk state, the resource allocation message including information of both talk-spurt radio resources available to a talk-spurt in the talk state and silent-period radio resources available in a silent state, the talk state in which the base station transmits voice information as voice packet data to the mobile terminal, and the silent state in which the base station transmits background noise data as the voice packet data to the mobile terminal, and a control processing circuit configured to judge whether the base station is in either said talk state or said silent state, release the talk-spurt radio resources allocated to said mobile terminal in the talk state when the base station detects a transition from the talk state to the silent state through said judgment, and allocate said released talk-spurt radio resources to another mobile terminal; and the mobile terminal including a receiver configured to receive said voice packet data by using said silent-period radio resources when said base station detects the transition from said talk state to said silent state.

10. The communication system of claim 9, wherein the silent-period radio resources include a parameter indicating a frequency region and a time region of a channel exclusive for the silent state which is disposed for transmission of the voice packet data including background noise data.

11. The communication system according to claim 9, wherein the silent-period radio resources include a parameter indicating a frequency region and a time region which specify a resource block, among the talk-spurt radio resources, to which the voice packet data including background noise data is allocated.

12. The communication system according to claim 9, wherein, when a second voice packet data is transmitted from the mobile terminal to the base station, a radio resource allocated for transmission of said second voice packet data is determined by using frequency hopping.

13. The communication system according to claim 9, wherein the persistent scheduling process performed by the base station includes performing scheduling according to the scheduling request signal transmitted from the mobile terminal, and a notifying a scheduling result at an arbitrary timing independent of the notification cycle of the persistent scheduling process.

14. The communication system according to claim 13, wherein the mobile terminal transmits the scheduling request signal to the base station, and the mobile terminal receives the scheduling result at an arbitrary timing independent of the notification cycle of the persistent scheduling process performed by the base station.

15. The communication system according to claim 9, wherein the resource allocation message is an L3 control signal which is a control signal notified from an upper layer so as to provide notification of the talk-spurt radio resources and the silent-period radio resources.

16. A mobile terminal which transmits a scheduling request signal to make a request of a base station for allocation of radio resources, the base station transmitting and receiving packet data by using an Orthogonal Frequency Division Multiplexing method as a downlink access method, the mobile terminal transmitting and receiving said packet data by using radio resources allocated thereto by said base station, and the base station performing a persistent scheduling process of transmitting a scheduling result in a predetermined notification cycle, the mobile terminal comprising:

a receiver configured to receive a resource allocation message from the base station at a time of entering a talk state, the resource allocation message including information of both talk-spurt radio resources available to a talk spurt in the talk state and silent-period radio resources available in a silent state, the talk state in which the base station transmits voice information as voice packet data to the mobile terminal, and the silent state in which the base station transmits background noise data as the voice packet data to the mobile terminal;

receive the voice packet data by using the silent-period radio resources when the base station detects a transition from the talk state to the silent state; and continuously receive, after transmitting the scheduling request signal to the base station, a scheduling result at a timing independent of a notification cycle of the persistent scheduling process performed by said base station.

* * * * *